United States Patent
Kishimoto

(10) Patent No.: US 6,517,934 B1
(45) Date of Patent: Feb. 11, 2003

(54) MAGNETIC RECORDING MEDIUM CONTAINING NANOMETER-SIZE SUBSTANTIALLY SPHERICAL OR ELLIPSOIDAL FE-B-RE MAGNETIC POWDER AND METHOD FOR PRODUCING MAGNETIC POWDER

(75) Inventor: Mikio Kishimoto, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/673,028

(22) PCT Filed: Feb. 8, 2000

(86) PCT No.: PCT/JP00/00661

§ 371 (c)(1),
(2), (4) Date: Oct. 10, 2000

(87) PCT Pub. No.: WO00/48210

PCT Pub. Date: Aug. 17, 2000

(30) Foreign Application Priority Data

Feb. 10, 1999 (JP) .............................................. 11/33018
Jun. 4, 1999 (JP) ............................................. 11/157202
Oct. 12, 1999 (JP) ............................................. 11/290283

(51) Int. Cl.$^7$ .............................................. G11B 5/706
(52) U.S. Cl. ........................ 428/323; 428/336; 428/402; 428/694 BA; 252/62.58; 148/100; 148/105; 148/301; 148/302; 148/306; 148/331; 75/349; 75/350
(58) Field of Search ................................ 428/323, 332, 428/334, 402, 403, 694 B, 694 BS, 694 BA, 900; 252/62.58; 148/100, 105, 301, 302, 306, 331; 75/348, 349, 350

(56) References Cited

U.S. PATENT DOCUMENTS

| | | | |
|---|---|---|---|
| 4,020,236 A | * | 4/1977 | Aonuma et al. ............. 428/457 |
| 4,324,177 A | | 4/1982 | Tsuji et al. |
| 4,863,793 A | | 9/1989 | Ogawa et al. |
| 4,952,444 A | | 8/1990 | Kawamata et al. |
| 4,963,433 A | | 10/1990 | Ogawa et al. |
| 5,156,922 A | * | 10/1992 | Mishima et al. ............. 428/570 |
| 5,252,380 A | | 10/1993 | Nakazumi et al. |
| 5,380,905 A | | 1/1995 | Haidos et al. |
| 5,474,623 A | * | 12/1995 | Ma et al. ..................... 148/101 |
| 5,496,607 A | | 3/1996 | Inaba et al. |
| 5,637,390 A | * | 6/1997 | Isobe et al. .................. 428/323 |
| 5,645,917 A | | 7/1997 | Ejiri et al. |
| 5,872,501 A | * | 2/1999 | Hamano et al. ............. 335/302 |
| 5,935,674 A | * | 8/1999 | Sato et al. .................. 428/65.3 |
| 6,103,021 A | * | 8/2000 | Sekine et al. ............... 148/105 |

FOREIGN PATENT DOCUMENTS

| | | |
|---|---|---|
| JP | 6050323 | 11/1985 |
| JP | 419815 | 1/1992 |
| JP | A5152115 | 6/1993 |
| JP | 5234064 | 9/1993 |
| JP | 625702 | 2/1994 |
| JP | 618062 | 3/1994 |
| JP | 6139553 | 5/1994 |
| JP | 06-199525 A | * 7/1994 |
| JP | A9251910 | 9/1997 |

OTHER PUBLICATIONS

Machine translation of JP 09–251910 A.*
Machine translation of JP 05–152115 A.*
JPO Abstract Translation of JP 06–199525 A (Clipped Image No. JP406199525 A).*
Machine Translation of JP 06–199525 A.*

* cited by examiner

*Primary Examiner*—Stevan A. Resan
*Assistant Examiner*—Kevin M. Bernatz
(74) *Attorney, Agent, or Firm*—Birch, Stewart, Kolasch & Birch, LLP

(57) ABSTRACT

A rare earth-iron-boron magnetic powder comprising a rare earth element, iron and boron, which has a coercive force of 80 to 400 kA/m, a saturation magnetization of 10 to 25 $\mu$W/g, an average particle size of 5 to 200 nm, and a particulate or ellipsoidal particle shape, and a magnetic recording medium having a magnetic layer which contains this magnetic powder and a binder, in which magnetic recording medium it is possible to practically use a very thin magnetic layer of 0.3 $\mu$m or less.

15 Claims, 1 Drawing Sheet

30nm

30nm

MAGNETIC RECORDING MEDIUM CONTAINING NANOMETER-SIZE SUBSTANTIALLY SPHERICAL OR ELLIPSOIDAL FE-B-RE MAGNETIC POWDER AND METHOD FOR PRODUCING MAGNETIC POWDER

FIELD OF THE INVENTION

The present invention relates to a magnetic recording medium, a magnetic powder, and a method for producing a magnetic powder. In particular, the present invention relates to a magnetic recording medium comprising a rare earth element-iron-boron magnetic powder, which is particularly suitable for use in ultra-high density recording, for example, a digital video tape, a backup tape of a computer, a large capacity floppy disc, etc.

BACKGROUND ART

Magnetic recording media are required to have a further increased recording density with the shift of a writing-reading system from an analog system to a digital system. In particular, when video tapes and backup tapes of computers, which face severe competition with hard discs or optical discs, cannot satisfy the above requirement, the continuance of the products may be endangered.

To satisfy the requirement to the increase the recording density, magnetic recording media comprising a thin film of a magnetic layer are proposed. However, so-called coating type magnetic recording media, which are produced by applying a magnetic paint containing a magnetic powder dispersed in a binder on a non-magnetic support, are superior to the thin metal film type ones in view of the productivity, and practical reliability such as corrosion resistance. Roughly speaking, the electromagnetic conversion characteristic of the coating type magnetic recording media has been improved by the improvement of magnetic powders and the improvement of production methods.

In connection with the improvement of the magnetic powders, the magnetic properties are year-by-year improved in conjunction with the miniaturization of the particle size to cope with the short-wavelength recording. Formerly, magnetic powders such as ferromagnetic iron oxide powder, cobalt-modified ferromagnetic iron oxide powder and chromium oxide powder, which are used for audio tapes or domestic video tapes, are mainly used, but recently acicular metal magnetic powders having a particle size of about 0.1 $\mu$m is proposed for the high density recording magnetic recording media.

To prevent the decrease of output due to the demagnetization in the short wavelength recording, a coercive force has been increased year-by-year, and the alloy of iron-cobalt achieved a coercive force of about 198.9 kA/m (see U.S. Pat. No. 5,252,380, JP-A-5-234064, JP-A-6-25702, JP-A-6-139553, etc.)

In connection with the improvement of the production methods of the magnetic recording media, the use of binders having various functional groups, the improvement of the dispersing technique of the above magnetic powders, and the improvement of the calendering method after the application process can remarkably increase the surface smoothness of the magnetic layers, and thus greatly contribute to the increase of the output in the short wavelength range (see U.S. Pat. Nos. 4,324,177, 4,952,444, JP-A-4-19815, etc.)

However, since the recording wavelength is shortened with the recent increase of the recording density, when the thickness of a magnetic layer is large, an output decreases only to 10 to 20% in the shortest recording wavelength range with the saturation magnetization or the coercive force of the conventional magnetic powders. In addition, since a very short recording wavelength is used, the influences of self-demagnetization loss in the course of writing and reading and thickness loss due to the thickness of the magnetic layer, which have not caused any problem, increase, and thus sufficient dissolution may not be attained. Such problems cannot be solved by the above-described improvement of the magnetic properties of the magnetic powders or the increase of the surface properties achieved by the production methods of the media. Thus, it is proposed to decrease the thickness of the magnetic layer.

In general, the effective thickness of the magnetic layer is about one third (⅓) of the shortest recording wavelength used in a system. For example, with the shortest recording wavelength of 1.0 $\mu$m, the thickness of the magnetic layer should be about 0.3 $\mu$m. Furthermore, with the miniaturization of a cassette, the whole thickness of the magnetic recording medium should be decreased to increase a recording capacity per unit volume. Consequently, the thickness of the magnetic layer should be decreased. In addition, to increase the recording density, the area of a writing magnetic flux, which is generated with a magnetic head, should be decreased, and thus the magnetic head is miniaturized. Therefore, the amount of the generated magnetic flux decreases. Accordingly, the magnetic layer should be made thin to cause complete reversal of magnetization with the minute magnetic flux.

When the thickness of the magnetic layer is decreased, the surface roughness of the non-magnetic support has some influence on the surface of the magnetic layer and thus the surface properties of the magnetic layer tend to deteriorate. Furthermore, when the thickness of a single magnetic layer is decreased, it may be contemplated to decrease the solid concentration of a magnetic paint or to decrease the amount of the magnetic paint applied. However, these methods cannot prevent defects formed in the course of application, or achieve the increase of the filling of the magnetic powder. Therefore, the strength of the coated film may deteriorate. Accordingly, to decrease the thickness of the magnetic layer by the improvement of the production methods of the magnetic recording media, a so-called simultaneous multiple layer coating method is proposed, which comprises providing an undercoat layer between a non-magnetic support and a magnetic layer, and applying a magnetic paint of the upper magnetic layer while the undercoat layer is still wet (see U.S. Pat. Nos. 4,863,793, 4,963,433, 5,645,917, 5,380,905, 5,496,607, etc.)

With such improvements of the coating methods, it becomes possible to thinly coat a magnetic layer having a thickness of about 1.0 $\mu$m, and such thin film-coating methods and the above-described improvement of the magnetic powders can solve the various problems such as the decrease of the output caused by the demagnetization, which is the essential problem of longitudinal recording.

However, in these days, the improvements of the magnetic powders and the production methods of the magnetic recording media reach the limits. In particular, in the case of the improvement of the magnetic powders, insofar as the acicular magnetic powder is used, the practical lower limit of the particle size is about 0.1 $\mu$m, because when t he particle size is less than about 0.1 $\mu$m, a specific surface area of the particle increases greatly, and thus not only the saturation magnetization decreases but also the dispersion of the magnetic powder in the binder becomes very difficult.

In connection with the coercive force, signals can be recorded on magnetic recording media having a very high coercive force because of the technical innovation of the magnetic heads. In particular, in the case of the longitudinal recording system, it is desirable to increase the coercive force to as high as possible to prevent the deterioration of the output due to the writing and reading demagnetization, insofar as the recorded signals can be erased with the magnetic head. Accordingly, the realistic and most effective method to increase the recording density of the magnetic recording media is to increase the coercive force of the media.

It is effective to further decrease the thickness of the magnetic layer to suppress the influence of the decrease of the output caused by the writing and reading demagnetization, which is the essential problem of the longitudinal recording. However, the thickness of the magnetic layer will reach the limit, insofar as the above-described acicular magnetic powder having a particle size of about 0.1 μm is used. The reason is as follows: the acicular particles are aligned in the plane direction of the magnetic recording medium on the average by longitudinal orientation, but some particles may be aligned in the direction perpendicular to the plane of the medium since the orientation of the particles has distribution. When such particles are contained, they deteriorate the surface smoothness of the medium and may increase noise. Such problems become more serious as the thickness of the magnetic layer decreases.

When the magnetic layer is made thin, it is necessary to dilute the magnetic paint with a large amount of an organic solvent. However, the conventional miniaturized acicular magnetic powder particles tend to cause the agglomeration of the magnetic paint. In addition, since a large amount of the organic solvent is evaporated when the applied magnetic paint is dried, the orientation of the magnetic powder particles is tend to be disturbed. Thus, in the case of tape-form media which are longitudinally recorded, the desired electromagnetic conversion may not be attained because of the deterioration of the orientation and the surface properties, even if the magnetic layer is made thin. Thus, it is very difficult to produce coating type magnetic recording media having the further decreased thickness of the magnetic layer, insofar as the conventional acicular magnetic powder is used, although it is known that the decrease of the thickness of the magnetic layer is effective to increase the recording characteristics of the media in the case of longitudinal recording.

Among the already proposed magnetic powders, the barium ferrite magnetic powders having platelet particle shapes, and comprising very fine magnetic particles with a particle size of 50 nm are known (see JP-B-60-50323, JP-B-6-18062, etc.) The shapes and particle sizes of the barium ferrite magnetic powders are more suitable for the production of the thin-layer coating type magnetic recording media than the acicular magnetic powders. However, since the barium ferrite magnetic powder is an oxide, its saturation magnetization is at most about 7.5 μWb/g, and thus it is theoretically impossible to achieve a saturation magnetization of 12.6 μWb/g or more, which is the level of the saturation magnetization of acicular metal or alloy magnetic powders. Therefore, when the barium ferrite magnetic powder is used, the high output cannot be attained since the saturation magnetization is low, although the coating type magnetic recording media comprising a thin magnetic layer may be produced. Thus, the barium ferrite magnetic powders are not suitable for the high recording density magnetic recording media. For the above reason, the above-described acicular magnetic powders has been dominantly used as the magnetic powders for the high recording density magnetic recording media.

As explained above, it is a very important problem to reduce the particle size of a magnetic powder while maintaining the coercive force and saturation magnetization at a as high level as possible to reduce thickness of the magnetic layer, which is an effective measure to increase the recording density of the magnetic recording media. To solve such a problem, firstly, the magnetic characteristics of the conventional magnetic powders are discussed. In the case of the currently used acicular magnetic powders, the increase of the coercive force has a limit theoretically, since its coercive force is based on the shape anisotropy of the acicular particles. That is, the magnetic anisotropy based on the shape anisotropy is expressed by $2\pi I_s$ wherein $I_s$ is a saturation magnetization, and thus proportional to the saturation magnetization. Thus, the coercive force increases as the saturation magnetization increases in the case of the acicular magnetic powders the coercive force of which is based on the shape anisotropy.

The saturation magnetization of a magnetic metal or alloy, for example, an Fe—Co ally reaches the maximum near a Fe/Co ratio of 70/30, as is well known from the Slater-Pauling's curve. Therefore, the coercive force also reaches the maximum at the above composition of the alloy. The acicular magnetic powder of such a Fe—Co alloy having a Fe/Co ratio of about 70/30 is already practically used. However, as already explained, insofar as the acicular magnetic powders are used, the theoretical limit of the coercive force is about 198.9 kA/m, and it is difficult to attain the higher coercive force. In addition, such acicular magnetic powders are not suitable for the thin layer coating type magnetic recording media.

The magnitude of the magnetic anisotropy based on the shape anisotropy is expressed by $2\pi I_s$ as explained above. The factor is $2\pi$ when the acicular ratio (particle length/particle diameter) of the magnetic powder is about 5 or more, but the factor quickly decreases when the acicular ratio is less than about 5. Finally the anisotropy disappears, when the particle becomes a sphere. That is, insofar as magnetic materials of metal iron or Fe—Co alloys are used as the magnetic powders, the shape of the magnetic powder particles should be in the acicular form (needle form) from the theoretical viewpoint.

DISCLOSURE OF THE INVENTION

In view of the above circumstances, it may be inevitable to create a novel magnetic powder which is based on a new concept different from the above-described conventional magnetic powder to attain the breakthrough of the coating type magnetic recording media.

The first object of the present invention is to provide a novel magnetic powder, which is entirely different from the conventional magnetic powders, as a magnetic powder for a magnetic recording medium having a very thin magnetic layer.

The second object of the present invention is to provide a coating type magnetic recording medium comprising such a novel magnetic powder and having excellent magnetic characteristics which cannot be achieved by the conventional magnetic powders.

The third object of the present invention is to provide a magnetic recording medium having much improved writing-reading characteristics in comparison with the coating type recording media comprising the conventional magnetic powders.

To achieve the above objects, the inventors set forth the basic guideline that the properties of magnetic powders necessary to remarkably increase the recording density of the coating type magnetic recording medium having a thin magnetic layer are the following properties (1) through (6), and have screened raw materials and studied methods for the production of magnetic powders suitable for such a magnetic recording medium:

(1) A coercive force is made as high as possible in the range where the recorded signals can be erased with a magnetic head;

(2) A magnetic powder comprises iron, which has the largest saturation magnetization among single elements and is abundantly available as a natural resource;

(3) A magnetic powder is that of a metal, a metal alloy or a metal compound to achieve high saturation magnetization;

(4) The particle shape of a magnetic powder is close to a sphere having the minimum specific surface area;

(5) The particle size of a magnetic powder is made as small as possible while maintaining saturation magnetization; and (6) A magnetic powder has a uniaxial magnetic anisotropy one direction (axis) of which is a magnetization easy direction (axis).

When the present inventors have made study to develop a magnetic powder which satisfies all the above properties, it has been found that only a rare earth element-iron-boron magnetic powder comprising a rear earth metal, iron and boron and having a specific structure satisfies all these properties, and that a high recording density magnetic recording medium can be obtained when a thin layer coating type magnetic recording medium is produced using such a rare earth element-iron-boron magnetic powder. Furthermore, it has been revealed that the rare earth element-iron-boron magnetic powder can provide a magnetic recording medium having a high coercive force and a high magnetic flux density, although it consists of particulate or ellipsoidal fine particles.

With a magnetic recording medium comprising a magnetic powder of particulate or ellipsoidal fine particles having a very small particle size like the magnetic powder of the present invention, magnetic interactions between the magnetic powder particles and thus it is possible to effect very quick reversal of magnetization so that the range of the reversal of magnetization is narrowed. Accordingly, such a magnetic recording medium has much better recording characteristics than magnetic recording media comprising the conventional acicular magnetic powders. Furthermore, the magnetic recording medium according to the present invention achieves the intended effects, particularly when the thickness of the magnetic layer is 3 µm or less, and the magnetic recording medium having such a thin magnetic layer is less influenced by a demagnetizing field, and exhibits good recording properties even at a coercive force of about 80 kA/m.

As a result of the further studies based on the above findings, it has been found that a magnetic recording medium having the following characteristics can exhibit remarkable characteristics.

With the recent trend to the high recording density, the digital recording systems have become predominant as described above. Thus, magnetic recording media are required to have a low error rate. From the above viewpoint, the present invention can provide a magnetic recording medium for digital recording having the excellent properties which cannot be achieved by the conventional magnetic recording media, when it satisfies the following requirements:

A) A magnetic recording medium has at least one undercoat layer comprising an inorganic powder and a binder on a non-magnetic support, and a magnetic layer comprising a magnetic powder and a binder on the undercoat layer, and the magnetic layer has an average thickness of 0.3 µm or less;

B) The anisotropic magnetic field distribution of a magnetic layer is set in a specific range;

C) The magnetization-easy-axis of a magnetic layer is in the machine (longitudinal) direction of the medium, a coercive force is from 80 to 400 kA/m, a squareness is from 0.6 to 0.9, and a saturated magnetic flux density is from 0.1 to 0.5 T, in the machine direction;

D) For applications in which the short wavelength characteristics are important, the magnetization-easy-direction is in a direction perpendicular to the magnetic layer plane, a coercive force is from 60 to 320 kA/m, a squareness is from 0.5 T to 0.8, and a saturated magnetic flux density is from 0.1 to 0.5 T, in the perpendicular direction.

When the magnetic recording medium of the present invention is used in a disc form, it is preferable that E) the magnetization-easy-directions are randomly distributed in the magnetic layer plane, and that a coercive force is from 60 to 380 kA/m, a squareness is from 0.4 to 0.7, and a saturated magnetic flux density is from 0.1 to 0.5 T, in any directions in the magnetic layer plane and the direction perpendicular to the magnetic layer plane.

In the case of the magnetic recording media comprising the conventional acicular magnetic powders, since the magnetic powder particles are mechanically oriented in a specific direction, a certain deorientation treatment is necessary. When the magnetic powder of the present invention is used, such deorientation may not be necessary, which is one of the large advantages of the present invention.

In the system using the recording with a short wavelength of 1.0 µm for the purpose of the high density recording, the above thin layer coating type magnetic recording media have been improved to attain the high output. As a result, F) it has been found that the high output can be obtained when a P-V value (in terms of the optical interference type three-dimensional surface roughness) is 50 nm or less.

Furthermore, the magnetic powder particles of the present invention are substantially not mechanically oriented so that they are aligned in parallel with the in-plane direction of the magnetic layer along the machine direction. Thus, the studies have been made to make use of the properties of the particulate or ellipsoidal magnetic powder. As a result, it has been found that G) a high elasticity is achieved in the transverse direction of the magnetic recording medium so that a good head touch, which is required to improve the properties in a helical scan system, is achieved.

EMBODIMENTS FOR CARRYING OUT THE INVENTION

Figure 1:
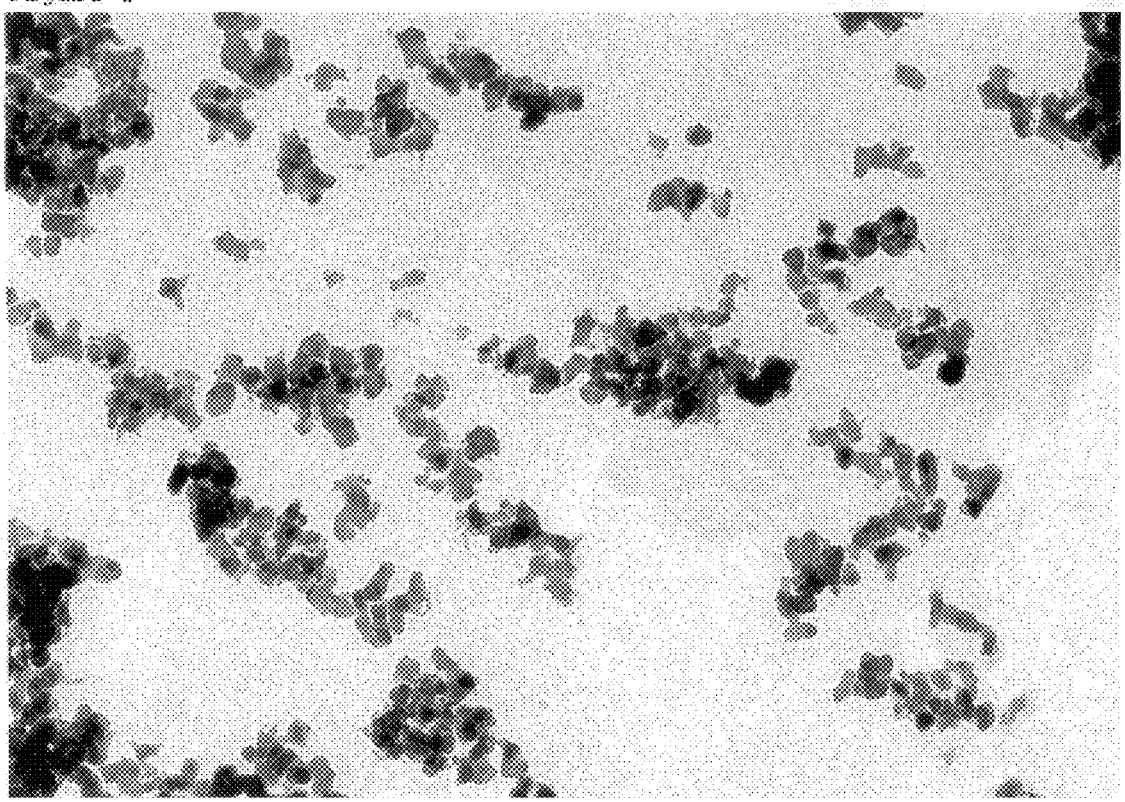
FIG. 1 is a transmission electron microscopic photograph (magnification: 100,000 times) of the neodymium-iron-boron magnetic powder having particulate or ellipsoidal particles, which is produced in Example 1.

With the conventional acicular iron-cobalt alloy magnetic powder, which is used for high density coating type magnetic recording medium, the coercive force (1) is reaching the theoretical limit among the above basic properties (1) through (6). In connection with the particle size (5), it is difficult to disperse the powder in a binder, if the particle size is further decreased from the current particle size. In addition, the most serious problem is that it is impossible to achieve the properties (4) and (6) at the same time, because the acicular ratio can be reduced only to about 5 since the coercive force is based on the shape anisotropy, that is, the acicular shape, and if the acicular ratio is further decreased to less than 5, the uniaxial anisotropy deteriorates and thus the coercive force becomes too small.

From the viewpoint different from the magnetic powders based on the shape magnetic anisotropy, the present inventors have synthesized various magnetic powders to improve the magnetic properties in accordance with the above-described basic guideline, and checked the magnetic anisotropy of the magnetic powders. Then, it has been found that the rare earth element-iron-boron magnetic materials comprising a rare earth element, iron and boron as constituent elements have large crystalline magnetic anisotropy, and therefore it is not necessary to form the particles in an acicular shape and that, when the particles are in the particulate or ellipsoidal shape, the magnetic powder has a large coercive force in one direction. Herein, the ellipsoidal magnetic powder particles mean those having a ratio of the major axis to the minor axis of 2 or less. Therefore, the magnetic powder particles of the present invention have essentially different shapes from those of the conventional powder particles for the magnetic recording media.

The rare earth element-iron-boron magnetic materials are known as high performance magnetic materials comprising particles of a submicron order, which are produced by powder metallurgical methods.

For example, a neodymium-iron-boron magnetic material for a permanent magnet has a composition represented by $Nd_2Fe_{14}B$, and a very large coercive force of 800 kA/m or more. However, the coercive force of the magnetic recording medium is determined in relation with a magnetic head, and it is said that the recording is possible with magnetic recording media having a coercive force which is up to about one sixth (⅙) of the saturated magnetic flux density of the magnetic head. Therefore, it is impossible to erase the recorded signals with the magnetic head when the magnetic powder has such a high coercive force as described above, and thus the magnetic powder cannot be used as a magnetic powder for the magnetic recording media.

The rare earth element-iron-boron magnetic material having the composition of $Nd_2Fe_{14}B$ has the very high coercive force as described above. According to the present invention, when samarium (Sm), terbium (Tb) or yttrium (Y) is used as a rare earth element in place of Nd, the magnetic powder has a coercive force sufficient for use in the magnetic recording media.

Since the rare earth element-iron-boron magnetic materials have attracted attentions as permanent magnet materials and have been studied, it has been revealed that Nd—Fe—B magnetic materials have particularly large magnetic anisotropy, and practically used. However, when the rare earth element-iron-boron magnetic materials are used in the magnetic recording media, the coercive force of the permanent magnets is too large and thus the recorded signals cannot be erased with the magnetic head. To achieve a coercive force suitable for the magnetic recording media, it is effective to decrease the amount of the rare earth element and increase the amount of boron in relation to iron, in comparison with the rare earth element-iron-boron magnetic materials for the permanent magnets. Hitherto, neodymium attracts attention as the rare earth element, but rare earth elements other than neodymium can be used for the magnetic recording media.

The reason why the rare earth elements other than neodymium, for example, samarium, terbium, yttrium, etc. can achieve the same effects as neodymium which is known as the rare earth element constituting the permanent magnets has not bee clarified, but it may be presumed that, when the particle size is very small like the magnetic powder of the present invention, the surface effects may be intensified, and thus the reaction among the rare earth element, a transition metal and boron may be excited.

That is, according to the present invention, the rare earth element-iron-boron magnetic materials, which have been regarded and studied as the permanent magnet materials, can be practically used as the magnetic materials for the magnetic recording media in the coercive force range lower than that of the permanent magnets.

According to the present invention, the high coercive force is achieved in the range where the recorded signals can be erased with the magnetic head, and also the excellent electromagnetic conversion characteristics as the thin layer coating type magnetic recording media can be attained, when the particulate or ellipsoidal rare earth element-iron-boron magnetic powder having an average particle size of 5 to 200 nm is produced by greatly decreasing the content of the rare earth element from the composition known for the materials of the permanent magnets or forming the core parts of the magnetic powder particles from metal iron or an iron alloy while forming the shell parts of the particles from the rare earth element-iron-boron magnetic material.

As the rare earth element contained in such magnetic powders, at least one element selected from the group consisting of yttrium, ytterbium, cesium, praseodymium, samarium, lanthanum, europium, neodymium and terbium is used. Among them, when neodymium, samarium, yttrium or terbium is used, a high coercive force can be easily attained.

When the specific rare earth element-iron-boron magnetic powder is used to produce the thin layer coating type magnetic recording media, the high coercive force and the high saturation magnetization can be achieved at the same time. That is, this type of the magnetic powder has the specific high saturation magnetization, since it contains the greatly decreased amount of the rare earth element and predominantly metal iron or the iron alloy. In particular, it has the highest saturation magnetization when the core part of the particle is formed from metal iron or an iron alloy, in particular, the iron-cobalt alloy.

Metal iron or the iron alloy alone has a low coercive force, since it has no shape anisotropy, but when the small amounts of the rare earth metal and boron are added thereto, the coercive-force greatly increases. In addition, when the core part of the particle is formed from metal iron or an iron alloy while the shell part surrounding the core part is formed from the rare earth element-iron-boron material, the magnetic powder has the large coercive force as a whole, since this material has the large coercive force. In this case, the material itself has a relatively low saturation magnetization, but the high saturation magnetization of metal iron or the iron alloy is maintained. As a result, the high saturation magnetization and the high coercive force are achieved at the same time.

The specific rare earth-iron-boron magnetic powder used according to the present invention may integrate the magnetic anisotropy of metal iron or the iron alloy and the magnetic anisotropy of the rare earth element-iron-boron material through the magnetic interaction, and may behave like a single magnetic material to exhibit the good electromagnetic properties even when it has the particle structure consisting of the core part and the shell part. The combination of a plurality of magnetic anisotropies in the particle through the magnetic interaction is firstly found in the present invention.

As a result of the studies on the particle size of the rare earth element-iron-boron magnetic powder, it has been found that the magnetic layer has good magnetic properties when the average particle size of the material is in the range between 5 and 200 nm. With the conventional acicular magnetic powder, the lower limit of the average particle size is about 0.1 $\mu$m to maintain the high coercive force. However, the magnetic powder of the present invention can be made very fine to have the average particle size of at least 5 nm, and such fine particles can exhibit good magnetic properties, since the coercive force is mainly based on the crystalline magnetic anisotropy. In particular, the average particle size is preferably at least 8 nm, more preferably at least 10 nm.

When the average particle size of the magnetic powder is too large, the filling properties of the magnetic powder in the magnetic layer deteriorate, and also the surface properties deteriorate when the magnetic layer is made thin. In addition, the particle noise due to the particle size increases when the magnetic recording medium is produced using such a magnetic powder having a large average particle size. Accordingly, the average particle size should be 200 nm or less and is preferably 100 nm or less, more preferably 50 nm or less. When the average particle size is adjusted in such a range, the very high filling properties are attained, and the excellent saturated magnetic flux density is achieved.

Herein, the average particle size of the magnetic powder is obtained by measuring the particle sizes of 500 particles in the transmission electron microscopic (TEM) photograph taken at a magnification of 100,000 times and averaging the measured particle sizes.

When the iron alloy is selected from metal iron and the iron alloy which contribute to the increase of the saturation magnetization in the rare earth element-iron-boron magnetic powder, examples of metals which form alloys with iron include magnetic transition metals such as Mn, Zn, Ni, Cu, Co, etc. Among them, Co and Ni are preferable. In particular, Co is preferable since it can increase also the saturation magnetization. The amount of the transition metal is preferably from 5 to 50 atomic %, more preferably from 10 to 30 atomic %, based on iron.

The amount of the rare earth element constituting the rare earth element-iron-boron material is from 0.2 to 20 atomic %, preferably from 0.3 to 15 atomic %, more preferably from 0.5 to 10 atomic %, based on iron in the while magnetic powder. The amount of the boron is from 0.5 to 30 atomic %, preferably from 1 to 25 atomic %, more preferably from 2 to 20 atomic %, based on iron in the whole magnetic powder. The atomic percentages of the rare earth element and boron are measured by the X-ray fluorescence analysis. When the above amounts of the rare earth metal and boron are contained in the material, the bonds of the atoms in the particles are enhanced by the magnetic interaction of a plurality of magnetic anisotropies, and thus the particles are united so that the coercive force of 80 to 400 kA/m, which is most suitable as the magnetic powder for the high performance magnetic recording media, can be achieved.

Now, the particle shape of the rare earth element-iron-boron magnetic powder is explained from the viewpoint of the dispersion of the powder in the magnetic paint and the properties required to form the thin magnetic layer.

In the case of the conventional acicular magnetic powders, the particle size is decreased to improve the recording properties such as the decrease of noise. As a result, the specific surface area of the particles inevitably increases. Thus, the interaction with the binder increases so that it becomes difficult to obtain a homogeneous dispersion when the magnetic powder is dispersed in the binder. Furthermore, when the magnetic paint dispersion is diluted with a large amount of an organic solvent to apply a thin layer, the magnetic powder particles tend to agglomerate, and therefore the orientation and surface properties deteriorate. Consequently, the particle size of the magnetic powder, which can be used in the production of the coating type magnetic recording media, is limited.

In contrast to the conventional magnetic powders, the rare earth element-iron-boron magnetic powder of the present invention has the particulate or acicular particle shape, and thus it can have a shape close to a sphere having the smallest specific surface area. Therefore, in comparison with the conventional magnetic powders, the magnetic powder of the present invention has a small interaction with the binder and can provide a magnetic paint with good flowability. If the magnetic powder particles are agglomerated, the redispersion of the particles is easy. Thus, the magnetic powder of the present invention can provide the magnetic paint which is particularly suitable for the formation of the thin magnetic layer. As a result, the magnetic powder having the average particle size of about 5 nm can be practically used.

The decrease of the thickness of the magnetic layer is effective to suppress the decrease of the output due to the writing and reading demagnetization, which is the essential problem of the longitudinal recording. Insofar as the acicular magnetic powder having the particle size of about 0.1 $\mu$m is used, the thickness of the magnetic layer is limited, because the acicular particles are aligned in the plane direction of the magnetic recording medium on the average by the orientation in the magnetic field, but some particles may be aligned in the direction perpendicular to the plane of the medium since the orientation of the particles has distribution. When such particles are contained, they protrude from the surface of the magnetic layer and deteriorate the surface properties of the medium and may increase noise. Such problems become more serious as the thickness of. the magnetic layer decreases. Thus, it is difficult to produce the coated film having a thickness of about 0.3 $\mu$m or less and also the smooth surface, insofar as the acicular magnetic powder is used.

When an undercoat layer is provided between the nonmagnetic support and the magnetic layer to reduce the thickness of the magnetic layer as explained below, and the undercoat layer is formed by the simultaneous multiple layer coating method in which the magnetic paint for the magnetic layer containing the dispersed acicular magnetic powder is coated over the undercoat layer while the undercoat layer is still wet, the magnetic powder is entrained by the undercoat layer so that the acicular magnetic powder particles tend to penetrate into the undercoat layer at the interface between the magnetic powder and the undercoat layer. Thus, the orientation of the magnetic powder particles is further disturbed, so that the desired squareness is not attained, and the surface smoothness of the magnetic layer deteriorates. Accordingly, the above problem may be one of the causes for a bar to the increase of the recording density by the thin layer coating when the acicular magnetic powder is used.

In contrast to the acicular magnetic powder, the rare earth element-iron-boron magnetic powder of the present invention has a small particle size and also the particulate or ellipsoidal particle shape and can have the particle shape close to the sphere. Therefore, the powder particles do not protrude from the surface of the magnetic layer. When the undercoat layer is provided, the penetration of the magnetic powder particles into the undercoat layer can be suppressed in contrast with the acicular magnetic powder. Accordingly, the magnetic layer having the extremely smooth surface can be formed.

As the thickness of the magnetic layer decreases, the magnetic flux from the magnetic layer decreases and thus the output decreases. Since the magnetic powder of the present invention has the particulate or ellipsoidal particle shape and can have the particle shape close to the sphere, it has an advantage such that the magnetic powder can be contained in the magnetic layer at a higher filling rate than the acicular magnetic powder and thus the high magnetic flux density can be easily attained.

Furthermore, with respect to the saturation magnetization, in general, the metal or metal alloy magnetic powders have the larger specific surface area as the particle size decreases, so that the ratio of the surface oxide layer which does not contribute to the saturation magnetization increases, while the magnet part contributing to the saturation magnetization decreases. That is, as the particle size decreases, the saturation magnetization decreases. This tendency is remarkable with the acicular magnetic powders, and the saturation magnetization suddenly decreases, when the major axis of the acicular particle is 0.1 $\mu$m or less. Such decrease of the saturation magnetization is taken into consideration, when the limit of the usable particle size is determined. Since the rare earth element-iron-boron magnetic powder of the present invention has the particular or ellipsoidal particle shape, the specific surface area is minimum among the particles having the same volume. Therefore, the magnetic powder of the present invention can maintain the high saturation magnetization in spite of the fine particle.

In the present invention, the particle shape of the rare earth element-iron-boron magnetic powder is expressed by "particulate or ellipsoidal". This intends to include any shape from substantially particulate to the ellipsoid including any intermediate shapes between the particle and the ellipsoid. That is, the above expression is intended to exclude the "acicular" shape of the conventional magnetic powders. Among various shapes, a sphere having the smallest specific surface area to an ellipsoid are preferable. The particle shapes can be observed using the scanning electron microscope.

As explained above, the rare earth element-iron-boron magnetic powder of the present invention has the saturation magnetization, coercive force, particle size and particle shape, all of which are essentially suitable to form the thin magnetic layer, and particularly good writing-reading characteristics can be achieved, when the magnetic recording medium having the magnetic layer with an average thickness of 0.3 $\mu$m or less is produced using such a magnetic powder. Among the magnetic powders of the present invention, those having a saturation magnetization of 10 to 25 $\mu$Wb/g are preferably used to improve the characteristics in the high recording density range in the case of the magnetic recording medium having the magnetic layer with the average thickness of 0.3 $\mu$m or less.

Herein, the coercive force and saturation magnetization of the magnetic powder are values, which are measured with a sample-vibration type magnetometer at 25° C. in an applied magnetic field of 1,273.3 kA/m and compensated using a standard sample.

The rare earth element-iron-boron magnetic powder of the present invention may be prepared by the following method:

Firstly, an aqueous solution containing the rare earth element ion such as neodymium, samarium, etc., the iron ion and optionally a transition metal ion such as Mn, Zn, Ni, Cu, Co, etc., and an aqueous solution of an alkali are mixed to form the coprecipitate of the rare earth element, iron and the optional transition metal. As the sources of the rare earth element ion, iron ion and transition metal ion, iron sulfate, iron nitrate and the like are used.

Next, a boron compound is mixed with the coprecipitate, and the mixture is heated at a temperature of 60 to 400° C. to obtain the oxide of the rare earth metal, iron and optionally the transition metal containing boron.

The boron compound serves as the source of boron and also functions as a flux which facilitates the crystal growth to the desired particle size while preventing the excessive sintering of the particles. The kind of the boron compound is not limited. Preferably, H3BO3, BO2, etc. are used.

Although the boron compound in the solid state may be mixed with the coprecipitate, the boron compound is dissolved in the aqueous suspension of the coprecipitate, the suspension is dried to remove water, and then the residue is heated so that the coprecipitate and boron are homogeneously mixed. Thereby, the magnetic powder having the better properties can be obtained.

The heated mixture is washed with water to remove the excessive boron, dried and then reduced by heating in a reducing atmosphere such as hydrogen gas at a temperature of 400 to 800° C. to obtain the rare earth element-iron-boron magnetic powder.

The magnetic powder of the present invention may contain other element to improve, for example, corrosion resistance. In this case, the amounts of the rare earth element and boron in the whole magnetic powder are preferably from 0.2 to 20 atomic % and from 0.5 to 30 atomic %, respectively, based on iron.

Alternatively, the rare earth element-iron-boron magnetic powder of the present invention may be produced as follows:

An aqueous solution containing the iron ion and optionally the transition metal ion such as Mn, Zn, Ni, Cu, Co, etc. and an aqueous solution of an alkali are mixed to form a precipitate of iron and the optional transition metal. Also in this method, iron sulfate, iron nitrate and the like are used as the sources of the iron ion and transition metal ion. Then, the salt of the rare earth element such as neodymium, samarium, etc. and the boron compound are mixed with the precipitate, and the mixture is heated at a temperature of 60 to 400° C. to obtain the oxide of the rare earth metal, iron and optionally the transition metal containing boron.

Next, excessive boron is removed, and the oxide is heated and reduced in the hydrogen gas like the above-described method to obtain the rare earth element-iron-boron magnetic powder.

The latter method is suitable to obtain the rare earth element-iron-boron magnetic powder having a structure comprising a core part mainly formed of metal iron or the iron alloy with the transition metal and an outer part mainly formed of the rare earth element-iron-boron material. Also in this method, the magnetic powder of the present invention may contain other element to improve, for example, corrosion resistance. Again, the amounts of the rare earth element and boron in the whole magnetic powder are preferable from 0.2 to 20 atomic % and from 0.5 to 30 atomic %, respectively, based on iron.

In the magnetic recording medium of the present invention, the magnetic layer is formed by mixing and dispersing the rare earth element-iron-boron magnetic powder, the binder and usually additives such as an abrasive, a dispersant, a lubricant, etc. as well as carbon black in an organic solvent to obtain the magnetic paint, applying the magnetic paint on the non-magnetic support with or without inserting the undercoat layer between them, and drying the applied magnetic paint.

The binder used in the magnetic layer may be a combination of a polyurethane resin and at least one resin selected from the group consisting of vinyl chloride resins, vinyl chloride-vinyl acetate copolymer resins, vinyl chloride-vinyl alcohol copolymer resins, vinyl chloride-vinyl acetate-maleic anhydride copolymer resin, vinyl chloride-hydroxyalkyl acrylate copolymer resins and nitrocellulose resins. Among them, the polyurethane resin and the vinyl chloride-hydroxyalkyl acrylate copolymer resin are preferably used in combination. Examples of the polyurethane resin include polyester plyurethane, polyether polyurethane, polyetherpolyester polyurethane, polycarbonate polyurethane, polyesterpolycarbonate polyurethane, etc.

Preferably, the binder resins have a functional group to improve the dispersibility of the magnetic powder and increase the filling rate of the magnetic powder. Examples of the functional group include —COOM, —SO$_3$M, —OSO$_3$M, —P=O(OM)$_3$, —O—P=O(OM)$_2$ (wherein M is a hydrogen atom, an alkali metal or an amine group), —OH, —NR$_2$, —N$^+$R$_3$ (wherein R is a hydrogen atom or a hydrocarbon group), an epoxy group, etc. When two or more resins are used in combination, they preferably have the same functional group.

The amount of the binder is usually from 5 to 50 wt. parts, preferably from 10 to 35 wt. parts, based on 100 wt. parts of the magnetic powder. In particular, when the vinyl chloride resin is used as the binder, its amount is from 5 to 30 wt. parts, and when the polyurethane resin is used, its amount is from 2 to 20 wt. parts. Most preferably, the vinyl chloride resin and the polyurethane resin are used in combination in the above amounts.

It is preferable to use the binder in combination with a thermally curing crosslinking agent which bonds with the functional group in the binder to crosslink the binder resin. Preferable examples of the crosslinking agent include polyisocyanates such as isocyanates (e.g. tolylenediisocyanate, hexamethylenediisocyanate, isophoronediisocyanate, etc.), reaction products of such isocyanates with a compound having a plurality of hydroxyl groups (e.g. trimethylolpropane, etc.), condensation products of such isocyanates, and the like. The amount of the crosslinking agent is usually from 15 to 70 wt. parts per 100 wt. parts of the binder.

To increase the strength of the magnetic layer, abrasives with high hardness is preferably used. As the abrasive, there may be used materials having a Mohs hardness of atl least 6, for example, α-alumina having an alphatization degree of at least 90%, β-alumina, silicon carbide, chromium oxide, cerium oxide, α-iron oxide, corrundom, artificial diamond, silicon nitride, silicon carbide, titanium carbide, titanium oxide, silicon dioxide, boron nitride, and mixtures thereof. Furthermore, complexes of these abrasives (for example, an abrasive the particle surfaces of which are treated with other abrasive) may be used. Among them, alumina particles are preferred, and examples of the commercially available alumina particles are "AKP-10", "AKP-12", "AKP-15", "AKP-30", "AKP-50", "HIT-82" and "HIT-60 (all available from Sumitomo Chemical Co., Ltd.), "UB 40B" (manufactured by Murakami Industries, Ltd.), and the like.

The particle size of the abrasive is preferably from 0.01 to 1 μm. If necessary, abrasives having different particles sizes, or a single abrasive having a particle size distribution may be used to achieve the same effects. The particle shape of the abrasive may be a needle form, a sphere, a cube, etc. and those having a corner in the shape are preferable since the abrasive having such shape has high abrading properties. The amount of the abrasive is usually from 6 to 20 wt. parts, preferably from 8 to 15 wt. parts, per 100 wt. parts of the magnetic powder from the viewpoint of the electromagnetic conversion properties and the contamination of the magnetic head.

Examples of the method for adding the abrasives such as alumina powder include a method comprising adding the abrasive directly to the magnetic paint containing the magnetic powder and the binder in the kneading step using a kneader or the pre-mixing step in the course of the preparation of the magnetic paint; a method comprising separately preparing a dispersion containing the abrasive and adding the dispersion to the magnetic paint; etc. The former method, which requires no separate step, is preferably used from the viewpoint of the productivity.

As one of the additives, a dispersant is preferably used. Examples of the dispersant include nonionic surfactants such as alkylene oxide base surfactants, glycerin base surfactants, glycidol base surfactants, alkylphenol-ethylene oxide adducts, etc.; cationic surfactants such as cyclic amines, ester amides, quaternary ammonium salts, hydantoin derivatives, heterocyclic compounds, phosphonium salts, sulfonium salts, etc.; anionic surfactants having an acid group such as a carboxylic acid group, a sulfonic acid group, a phosphoric acid group, a sulfate ester group, a phosphate ester group, etc.; amphoteric surfactants such as amino acids, aminosulfonic acid, sulfate or phosphate esters of aminoalcohols, etc.; and the like.

As other dispersants, Ti-containing dispersants, P-containing dispersants, etc. may be used. Examples of the Ti-containing dispersants are titanate coupling agents such as "PLENACT KR-38S", "PLENACT KR-TTS", "PLENACT KR-46B", "PLENACT KR-55", "PLENACT KR-41B", "PLENACT KR-138S", "PLENACT KR-238S", "PLENACT KR-44" and "PLENACT KR-9SA" (all available from AJINOMOTO). Examples of the P-containing dispersants include alkyl phosphates such as monomethyl phosphate, dimethyl phosphate, monoethyl phosphate, diethyl phosphate, etc.; and aromatic phosphates such as phenyl phosphate, etc. Examples of the commercially available P-containing dispersants are "GARFAC RS410" (manufactured by TOHO CHEMICAL), "JP-502" and "JP-508" (both manufactured by JOHOKU CHEMICAL INDUSTRIES), etc.

A further additive contained in the magnetic layer is preferably a lubricant. Examples of the lubricant include known fatty acids, fatty acid esters, fatty acid amides, metal salts of fatty acids, hydrocarbon, and mixtures of two or more of them. Among them, fatty acids having at least 10 carbon atoms, preferably 12 to 24 carbon atoms are preferably used. Such fatty acids partly adhere to the magnetic powder to facilitate the dispersing of the magnetic powder and also soften the contact between the medium and the magnetic head in the initial abrading state to decrease a coefficient of friction. Thus, the fatty acids contribute to the suppression of the head contamination.

The fatty acids may be linear or branched and unsaturated or saturated ones. The linear fatty acids are preferable since they have good lubrication properties. Examples of the linear fatty acids include lauric acid, myristic acid, stearic acid, palmitic acid, oleic acid, isostearic acid, etc.

The amount of the dispersant is preferably from 0.5 to 5 wt. parts, more preferably from 1 to 4 wt. parts, per 100 wt. parts of the magnetic powder. The amount of the lubricant is preferably from 0.2 to 10 wt. parts, more preferably from 0.5 to 5 wt. parts, per 100 wt. parts of the magnetic powder.

To decrease the coefficient of friction of the magnetic layer and prevent the electrostatic charge, carbon black is preferably used. Examples of the carbon black include furnace black for rubbers, thermal black for rubbers, carbon black for coloring, acetylene black, etc. The carbon black preferably has a specific surface area of 5 to 500 $m^2/g$, a DBP oil absorption of 10 to 400 ml/100 g, a particle size of 5 to 400 nm, pH of 2 to 10, a water content of 0.1 to 10 wt. %, and a tap density of 0.1 to 1 g/cc. Examples of the commercially available carbon black are "SEVACARB MTCI" (manufactured by Columbian Carbon), "Thermax Powder N-991" (manufactured by CANCARB), etc.

The amount of the carbon black added is usually 3 wt. % or less based on the magnetic powder.

In the formation of the magnetic layer, any conventionally used organic solvent may be used as the organic solvent which is used in the preparation of the magnetic paint and the lubricant solution. Examples of the organic solvent include aromatic solvents (e.g. benzene, toluene, xylene, etc.), ketone solvents (e.g. acetone, cyclohexanone, methyl ethyl ketone, methyl isobutyl ketone, etc.), acetate solvents (e.g. ethyl acetate, butyl acetate, tec.), carbonate solvents (e.g. dimethyl carbonate, diethyl carbonate, etc.), alcohols (e.g. ethanol, isopropanol, etc.), hexane, tetrahydrofuran, dimethylformamide, and so on.

In the production of the magnetic recording media of the present invention, any known method for the preparation of paints can be used to form the magnetic layer and the undercoat layer which will be described below. In particular, a kneading process using a kneader or the like and a primary dispersing process are preferably used in combination. In the primary dispersion process, a sand mill is preferably used since the dispersibility of the magnetic powder is improved and also the surface properties of the magnetic layer can be controlled.

In the primary dispersing process, zirconia beads having high hardness are preferably used as dispersing media. As the zirconia beads used as the dispersing media, those produced by the cold isobar press (CIP) method or the hot isobar press (HIP) method are preferably used. More preferably, the zircona beads produced by the HIP method are used, since they have a density close to the theoretical density and thus the beads are hardly cracked by the strong dispersion in the sand mill and the like, and they are uniformly abraded. Examples of such zirconia beads are TORAYCERAM (manufactured by TORAY), ZIRCONIA BALL (manufactured by NIPPON KAGAKU TOGYO), etc. The dispersing time may be suitably adjusted in the range between 30 and 100 minutes in terms of the residence time of the paint.

The magnetic properties of the magnetic layer, which is formed as described above and contains the magnetic powder, the binder and the other components, preferably include a coercive force of from 80 to 400 kA/m, particularly from 95 to 320 kA/m in the machine direction of the magnetic recording medium, and a saturated magnetic flux density of from 0.1 to 0.5 T, particularly from 0.2 to 0.4 T, when the magnetization-easy-axis is in the machine direction.

When the magnetization-easy-axis is in the direction perpendicular to the magnetic layer, the coercive force in the perpendicular direction is preferably from 60 to 320 kA/m, particularly from 70 to 300 kA/m, and the saturated magnetic flux density is preferably from 0.1 to 0.5 T, more preferably from 0.2 to 0.5 T. Furthermore, in the case of the magnetic recording medium in which the magnetization-easy-axes are randomly distributed in the plane of the magnetic layer, the coercive force is preferably from 60 to 380 kA/m, particularly from 70 to 300 kA/m, and the saturated magnetic flux density is preferably from 0.1 to 0.5 T, particularly from 0.2 to 0.4 T in any directions in the plane of the magnetic layer and also in the direction perpendicular to the magnetic layer.

Herein, the above magnetic properties are measured using a sample-vibration type magnetometer at 25° C. in an external magnetic field of 1273.3 kA/m like in the case of the magnetic powder with a laminated sample having 20 magnetic layer planes and a diameter of 8 mm. The measured values are compensated using the standard sample.

As explained in the above, when the magnetic recording media are produced using the rare earth element-iron-boron magnetic powder according to the present invention, it does not require such a large saturation magnetization as required by the acicular magnetic powder. When the signals are recorded on the magnetic recording media, the domains of the reversal of magnetization in the media do not contribute to the output. Thus, such domains are preferably made as small as possible. However, with the conventional acicular magnetic powder the coercive force of which is based on the shape magnetic anisotropy, the magnetic interaction among the magnetic powder particles increases as the saturation magnetization increases, and thus a large static magnetic energy is accumulated when the reversal of magnetization is effected quickly. Therefore, the reversal of magnetization should be effected slowly. As a result, the domains of the reversal of magnetization extend. In contrast, the coercive force of the rare earth element-iron-boron magnetic powder is based on the crystalline magnetic anisotropy, and thus the magnetic interaction among the magnetic powder particles is low. As a result, the reversal of magnetization can be effected quickly. Thus, the domains of the reversal of magnetization are narrowed and the large output can be obtained even with the relatively small saturation magnetization.

According to the magnetic recording media of the present invention, their properties are remarkably exhibited to solve the decrease of the output due to the demagnetization, which is the essential problem of the longitudinal recording, when the magnetic layer is made thin to have the average thickness of 0.3 $\mu$m or less, preferably from 0.01 to 0.3 $\mu$m, more preferably from 0.01 to 0.2 $\mu$m. The thickness of the magnetic layer is determined depending on the recording wavelength used. The effects of the present invention can be particularly exhibited when the present invention is applied to the recording system using the shortest recording wavelength of 1.0 $\mu$m or less. For example, with the system using the shortest recording wavelength of 0.6 $\mu$m such as DLT-4, the average thickness of the magnetic layer is preferably about 0.2 $\mu$m, and with the system using the shortest recording wavelength of 0.33 $\mu$m such as DDS-3, the average thickness of the magnetic layer is preferably about 0.1 μm. Thus, the present invention is preferably applied to the systems requiring the very think magnetic layers. From the viewpoint of the productivity, the lower limit of the thickness of the magnetic layer is preferably 0.01 μm.

The anisotropic magnetic field distribution of the magnetic recording media of the present invention is preferably 0.6 or less in the case of the longitudinally oriented magnetic recording media. When the anisotropic magnetic filed distribution of the magnetic recording media with the longitudinal orientation is 0.6 or less, the dispersibility and orientation properties of the fine particles of the magnetic powder according to the present invention are improved, so that the output at the short wavelength is increased and the error rate is improved even when the coercive force is the same.

In general, the value of the anisotropic magnetic filed distribution decreases as the orientation properties of the magnetic powder increases, since the former depends on the latter. However, the magnetic powder of the present invention exhibits the good anisotropic magnetic filed distribution even at random distribution, since it has the better particle size distribution than the conventional acicular magnetic powder.

When the magnetic recording media of the present invention are used in the high density recording systems with the shortest recording wavelength of 1.0 μm or less, a P-V value (in terms of the optical interference type three-dimensional surface roughness) is preferably 50 nm or less, more preferably 40 nm or less, to achieve the high output. That is, with the conventional acicular magnetic powder, when the magnetic recording media are produced to have a multiple layer-structure having the undercoat layer to decrease the thickness of the magnetic layer, the magnetic powder particles tend to penetrate in the undercoat layer in comparison with the direct application of the magnetic layer on the non-magnetic support. Therefore, the magnetic powder particles are not aligned in parallel with the surface of the magnetic layer, so that the surface properties tends to deteriorate. However, since the magnetic powder particles of the present invention have the particulate or ellipsoidal shape, they do not deteriorate the surface properties in the course of the orientation. In addition, although the magnetic powder of the present invention consists of very fine particles having an average particle size of 5 to 200 nm, it hardly agglomerates, and thus it has good dispersibility. As a result, the magnetic powder of the present invention can improve the surface smoothness of the magnetic layer and achieve the high output in cooperation with the above-described high coercive force, even when the shortest recording wavelength is 1.0 μm or less.

Herein, the surface roughness is measured using a non-contact type surface roughness meter TOPO-3D (manufactured by WYKO) to which an object head (magnification of 40 times) is attached, at a measuring wavelength of 648.9 nm and a measuring Aarea of 250 μm×250 μm with the curvatures and cylindrical corrections. The surface roughness is measured 4 times at each measuring point and the measured values are averaged to obtain the surface roughness (P-V) at each point, and the surface roughness values at 10 measuring points are again averaged.

Since the magnetic recording medium should be in contact with the magnetic head with the medium being wound around the cylinder in the helical scanning system, the strength of the magnetic recording medium in the machine direction and the transverse direction should be optimized to increase the head contact of the medium. Quite recently, in the helical scanning system, the tip of the magnetic head is shaped to have an acute angle so that the amount of indentation in the magnetic layer increases, and the system is designed so that the relative speed of the magnetic tape and the magnetic head is very high. Therefore, the deterioration of the head contact leads to the deterioration of an envelope. From such a viewpoint, to improve the head contact of the medium against the magnetic head, a ratio of a Young's modulus in the transverse direction ($Y_{TD}$) to that ($Y_{MD}$) in the machine direction of the medium ($Y_{TD}/Y_{MD}$) is preferably from 1.0 to 1.7. Since the conventional magnetic powder particles have the needle-form shape, they are oriented so that the major axes are in parallel with the plane of the magnetic layer by the mechanical orientation step when the magnetic paint is applied. In addition, they are oriented in the magnetic field in the machine direction to attain the high squareness. Thus, the major axes of the particles are further aligned in the machine direction. Therefore, the strength of the magnetic layer in the machine direction is inevitably stronger than that in the transverse direction, and the head contact against the magnetic head, which is desired to be isotropic, deteriorates. In contrast, since the magnetic recording media of the present invention use the magnetic powder particles having the particulate or ellipsoidal shape, the magnetic powder particles are hardly mechanically oriented in the course of the application of the magnetic paint in comparison with the acicular magnetic powder, and they are less oriented in parallel with the plane of the magnetic layer. As a result, the strength of the magnetic recording media in the transverse direction can be increased. Thus, the above ratio ($Y_{TD}/Y_{MD}$) is preferably from 1.2 to 1.6. Herein, the Young's modulus is measured with 0.3% elongation at 25° C., 60%RH.

When the magnetic layer is made thin in the present invention, a least one undercoat layer is provided between the non-magnetic support and the magnetic layer so that the good surface smoothness due to the particle shape of the magnetic powder can be attained readily. Since the specific magnetic powder used in the present invention can provide the magnetic paint with good flowability so that the leveling of the applied paint is improved and thus the formed magnetic layer has good surface smoothness. When the undercoat layer having the similar coating properties to those of the magnetic paint is provided, the leveling of the applied magnetic paint is improved in comparison to the direct application of the magnetic paint to the non-magnetic support, and also the influence of the surface conditions of the non-magnetic support on the surface properties of the magnetic layer can be suppressed.

The undercoat layer may contain inorganic powder, a binder, a lubricant, carbon black, and so on. The inorganic powder may be either a magnetic one or a non-magnetic one. Examples of the non-magnetic powder include α-alumina having an alphatization degree of at least 90%, β-alumina, γ-alumina, α-iron oxide, $TiO_2$ (rutile or anatase type), $TiO_x$, cerium oxide, tin oxide, tungsten oxide, ZnO, $ZrO_2$, $SiO_2$, $Cr_2O_3$, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, titanium carbide, and mixtures thereof. Examples of the magnetic powder include γ-$Fe_2O_3$, cobalt-containing γ-$Fe_2O_3$, Fe alloys, $CrO_2$, barium ferrite, etc.

The inorganic powders may have spherical, acicular or platelet shapes. The particle size of the inorganic powder preferably do not exceed 0.5 μm, since the inorganic powder having the too large particle size deteriorates the surface properties of the undercoat layer and in turn influences the surface properties of the magnetic layer. When the particle size of the inorganic powder is too small, the filling rate of the inorganic powder in the undercoat layer increases so that the volume of vacancies which retain the lubricant decreases and also the cushioning effects deteriorate. Thus, the particle size of the inorganic powder is preferably at least 0.05 μm.

The amount of the inorganic powder used is preferably from 60 to 90 wt. %, particularly from 70 to 80 wt. % for the same reasons as described above in connection with the particle size.

The binder used in the undercoat layer may be the resin as that used in the formation of the magnetic layer, and is preferably the same kind resin as that contained in the magnetic layer. In particular, when the same combination of the vinyl chloride resin and the polyurethane resin is used in the magnetic layer and the undercoat layer, the elasticities of the both layers are close so that the load from the magnetic head can be scattered in the both layers.

The binder in the undercoat layer preferably has the same functional group(s) as that of the binder in the magnetic layer. In particular, in the combination of the vinyl chloride resin and the polyurethane resin, the resins in the undercoat layer and those in the magnetic layer preferably have the same functional groups, since the adhesion between the two layer is increased, and furthermore the exudation of the lubricant from the undercoat layer to the magnetic layer is facilitated.

The amount of the binder in the undercoat layer is preferably from 15 to 45 wt. parts, particularly from 15 to 40 wt. parts, per 100 wt. parts of the inorganic powder.

Furthermore, it is preferable to use a thermally curing crosslinking agent, which crosslinks the binder through the bonding of the functional groups of the binder, like in the case of the magnetic layer. The amount of the crosslinking agent is preferably from 15 to 70 wt. parts per 100 wt. parts of the binder.

Also, the same lubricant as that used in the magnetic layer can be used in the undercoat layer, but it is preferable to use the fatty acid ester only or the mixture of the fatty acid and the fatty acid ester having the increased ratio of the fatty acid ester, since the fatty acid is less exuded in the upper magnetic layer than the fatty acid ester. The amount of the lubricant added to the undercoat layer is usually from 2 to 18 wt. parts, preferably from 2.5 to 16 wt. parts, more preferably from 2.5 to 14 wt. parts, per 100 wt. parts of the inorganic powder. The weight ratio of the fatty acid to the fatty acid ester added to the undercoat layer is preferably from 0:100 to 50:40, particularly from 0:100 to 50:50. To add the lubricant to the undercoat layer, the lubricant is added to a paint for the undercoat layer before, during or after mixing with a kneader and the like, or the solution of the lubricant is applied or spray coated to the surface of the already formed undercoat layer.

As the carbon black used in the undercoat layer, a combination of carbon black having a particle size of 0.01 to 0.03 μm and carbon black having particle size of 0.05 to 0.3 μm is preferably used. The former carbon black is used to retain the vacancies which maintain the lubricant like in the case of the magnetic layer, while the latter carbon black copes with both the increase of the film strength of the undercoat layer and the cushioning effects. The amount of carbon black added to the undercoat layer in total is preferably from 5 to 70 wt. parts, particularly from 15 to 40 wt. parts, per 100 wt. parts of the inorganic powder.

Examples of the carbon black having a particle size of 0.01 to 0.03 μm include "BLACK PEARLS 800", "Mogul-L", "VULCAN XC-72", "Regel 660R" (all available from Cabot); "Raven 1255" and "Conductex SC" (both available from Columbian Carbon); etc. Examples of the carbon black having particle size of 0.05 to 0.3 μm include "BLACK PEARLS 130" and "Monarch 120" (both available from Cabot); "Raven 450" and "Raven 410" (both available from Columbian Carbon); "Termax Powder N-991" (available from CANCARB); etc.

As the solvents used to prepare the paint for the undercoat layer or the lubricant solution in the formation of the undercoat layer, organic solvents such as aromatic solvents, ketone solvents, ester solvents, alcohols, hexane, tetrahydrofuran, and so on may be used like in the formation of the magnetic layer.

The average thickness of the undercoat layer is preferably from 0.1 to 10 μm. more preferably from 0.5 to 5 μm. The average thickness of the undercoat layer is preferably 1.1 to 200 times, more preferably 2 to 50 times larger than the average thickness of the magnetic layer.

Herein, the average thickness of the magnetic layer or the undercoat layer is obtained by cutting the magnetic recording medium with a microtome, taking a transmission electron microscopic photograph of the cross section of the cut medium (magnification: 50,000 times), measuring the thickness of the magnetic layer or the undercoat layer at 10 points with an interval of 1 cm, and averaging the five measured values.

In the present invention, the non-magnetic support may be any one of those conventionally used in the magnetic recording media. Specific examples of the support are plastic films having a thickness of 2 to 100 μm made of polyesters (e.g. polyethylene terephthalate, polyethylene naphthalate, etc.), polyolefin, cellulose triacetate, polycarbonate, polysulfone, polyamides (e.g. polyamide, polyimide, polyamideimide, aramide, aromatic polyamide, etc.), and the like. Among the non-magnetic supports, the polyester film or the polyamide film with the improved strength in the transverse direction is preferably used, which has a Young's modulus of at least $5.0 \times 10^9$ N/m$^2$, preferably $6.0 \times 10^9$ N/m$^2$ to 22.0 $10^9$ N/m$^2$ in the transverse direction at an elongation of 0.3%, to improve the head contact with the magnetic head when the total thickness of the medium is reduced for the purpose of the high density recording.

It is preferable to use a non-magnetic support having different surface roughness on both surfaces when a back coat layer is formed on the surface of the support opposite to the magnetic layer. The difference of the surface properties makes it easy to control the P-V value of the magnetic layer.

The non-magnetic support may have a resin layer to improve the adhesion to the undercoat layer. Examples of the resin of the resin layer include polyester resins, polyurethane resins, etc. Among them, the resins having functional groups such as —COOM, —SO$_3$M, —OSO$_3$M, —P=O(OM)$_3$, —O—P=O(OM)$_2$ (wherein M is a hydrogen atom, an alkali metal or an amine group) are preferable, since they have good adhesion to the non-magnetic support and improve the adhesion to the undercoat layer. The resin layer may contain an inorganic powder such as silica to prevent blocking. The thickness of the resin layer is preferably 0.1 μm or less, particularly from 0.01 to 0.08 μm.

When the non-magnetic support has the large anisotropy of shrinkage which is generated in a service atmosphere, in particular a high temperature atmosphere, the followability deteriorates and thus the tracking errors tend to occur. Therefore, the non-magnetic support preferably has a thermal shrinkage (at 105° C., 30 minutes) of 1.5% or less in the machine direction and 1.0% or less in the transverse direction, when the thermal shrinkage is measured by heating the support at 105° C. for 30 minutes and then cooling it. In detail, the thermal shrinkage is measured as follows:

Six samples each having a width of 10 mm and a length of 300 mm are collected from the non-magnetic support in the machine direction or the transverse direction and heated at 105° C. for 30 minutes in a hot air followed by cooling. The length of each sample is measured, and the thermal shrinkage is calculated according to the following equation:

Thermal shrinkage (%)=[(Original length—Length after shrink)/Original length]×100

Then the calculated thermal shrinkage values of six samples are averaged.

In the application steps to form the undercoat layer and the magnetic layer on the non-magnetic support according to the present invention, any conventional application methods such as gravure coating, roll coating, blade coating, extrusion coating, etc. may be used. The application method of the undercoat layer and the magnetic layer may be the sequential multiple layer coating method in which the magnetic paint of the magnetic layer is applied on the undercoat layer which has been applied on the non-magnetic support and dried, or the simultaneous multiple layer coating method in which the undercoat layer and the magnetic layer are applied at the same time. In view of the leveling of the thin magnetic layer in the course of the application, the simultaneous multiple layer coating method, which applies the paint for the magnetic layer while the undercoat layer is still wet, is preferably used. The present invention is particularly effective in the simultaneous multiple layer coating method, since in the simultaneous multiple layer coating method which applies the magnetic layer while the undercoat layer is still wet, the interface between the undercoat layer and the magnetic layer is disturbed and the magnetic powder particles tend to penetrate in the undercoat layer so that the surface properties of the magnetic layer tend to deteriorate.

Examples of such coating methods includes a method comprising applying the paint of the undercoat layer by gravure coating, roll coating etc. and applying the magnetic paint using an extrusion type coating head with providing a back roll on the undercoat layer; a method comprising applying the paint of the undercoat layer and applying the magnetic paint with an extrusion type coating head with forcing the head against the undercoat layer while supporting the non-magnetic support with a back-up roll; a method comprising applying the paint of the undercoat layer and the magnetic paint using an integrated extrusion type coating head having two or more slits which discharge the paint of the undercoat layer and the magnetic paint, respectively; and the like, which are disclosed in JP-A-48-22605, JP-A-48-988031, JP-A-48-99233, JP-A-61-139929, etc.

The magnetic recording media of the present invention may have a back coat layer on the surface of the non-magnetic support opposite to the magnetic layer. Besides conductive carbon black, the back coat layer may contain inorganic non-magnetic powders which are known as abrasives to decrease the coefficient of friction and to increase the mechanical strength. Examples of such non-magnetic powders include $\alpha$-$Fe_2O_3$, $Fe_3O_4$, $TiO_2$, graphite, $CaO$, $SiO_2$, $Cr_2O_3$, $\alpha$-$Al_2O_3$, $SiC$, $CaCO_3$, $BaSO_4$, $ZnO$, $MgO$, boron nitride, $TiC$, $ZnS$, $MgCO_3$, $SnO_3$, etc. If desired, the back coat may further contain lubricants such as higher fatty acids, fatty acid esters, silicone oils, etc.; dispersants such as surfactants; and other additives.

The binders of the back coat layer may be the same as those used in the magnetic layer. Among them, the combination of the cellulose resin and the polyurethane is preferable.

The amount of the binder used is preferably from about 15 to 200 wt. parts per 100 wt. parts of the carbon black and the inorganic non-magnetic powder. To cure the binder, a crosslinking agent such as poyisocyante may be used in combination with the binder.

The average thickness of the back coat layer is preferably from about 0.3 to 1.0 $\mu$m after calendering. When the thickness of the back coat layer is too large, the total thickness of the magnetic recording medium becomes too large. When the thickness of the back coat layer is too small, the surface properties of the back coat layer deteriorate by the influence of the surface properties of the non-magnetic support so that the surface conditions of the back coat layer are transferred to the magnetic layer surface and thus the electromagnetic conversion characteristics, etc. may deteriorate.

In the production of the magnetic recording media of the present invention, the surface of the magnetic layer is preferably treated by calendering with a plastic roll or a metal roll. The calendering can adjust the P-V value of the surface of the magnetic layer. In addition, the filling rate of the magnetic powder can be increased to increase the residual magnetic flux density. A calendering temperature is preferably at least 60° C., particularly from 80 to 200° C. A linear pressure is preferably at least 115 kN/m, particularly from 150 to 400 kN/m, and a calendering speed is preferably from 20 to 700 m/min. In particular, the above effects can be enhanced when the calendering is carried out at a temperature of at least 80° C. under a linear pressure of at least 190 kN/m.

In the production of the magnetic recording media of the present invention, the media are aged after the above calendering. The aging can promote the curing of the coated film and improve the film strength. The aging is preferably carried out at a temperature of 70° C. or less, since when the aging temperature is too high, the winding constriction of the magnetic sheet becomes too high so that the surface roughness of the back coat layer is transferred to the magnetic layer and thus the surface properties of the magnetic layer tend to deteriorate. To adjust the wetness, the aging is preferably carried out under a humidity of 5 to 60%RH.

Furthermore, it is preferable to abrade the surface of the magnetic layer after drying to remove dusts causing dropouts from the surface of the magnetic surface and also the vulnerable parts of the surface of the magnetic layer, and to adjust the surface properties of the magnetic layer. The abrading treatment may be carried out with a blade or an abrasive wheel. From the viewpoint of the productivity, the treatment with the abrasive wheel is preferable. The treatment with the abrasive wheel is described in, for example, JP-A-62-150519, JP-A-62-172532, JPA-A-2-23521, etc. As a material used to form the abrading part of the wheel, ceramics, super steel, sapphire, diamond, and the like may be exemplified. When the abrasive wheel is used, the peripheral speed of the wheel is preferably ±200% of the tape running speed (50 to 300 m/min.), and an winding angle of the tape around the wheel is preferably from 10 to 80 degrees.

EXAMPLES

The present invention will be illustrate by the following Examples, in which "parts" mean "parts by weight".

<Preparation of magnetic powder>

Examples 1–14 and Comparative Examples 1–7

Example 1

Preparation of neodymium-iron-boron magnetic powder I

Iron (III) nitrate (0.074 mole) and neodymium nitrate (0.002 mole) were dissolved in water (600 cc). Separately, sodium hydroxide (0.222 mole) was dissolved in water (600 cc). The former solution of the nitrates was added to the latter solution of sodium hydroxide and stirred for 5 minutes to obtain the hydroxides of iron and neodymium. The hydroxides were washed with water and filtrated to recover the hydroxides. Then, water (30 cc) and boric acid ($H_3BO_3$) (0.5 mole) were added to the wet hydroxides to redisperse the hydroxides of iron and neodymium in the aqueous solution of boric acid while heating it at 60° C. The dispersion was spread in a vat and dried at 60° C. for 4 hours to remove water. Thus, the homogeneous mixture of the hydroxides of iron and neodymium and boric acid was obtained.

The mixture was then comminuted and charged in an aluminum crucible and heated in an air at 200° C. for 4 hours to obtain neodymium-iron oxide to which boron was bonded. In this reaction, boric acid was the source of boron and also functioned as a flux which facilitated the crystal growth to the intended particle size while preventing the excessive sintering of the particles.

The heated material was washed with water to remove excessive boron to obtain the neodymium-iron oxide particles to which boron was bonded.

The oxide particles were heated and reduced in a hydrogen stream at 450° C. for 4 hours to obtain a neodymium-iron-boron magnetic powder. The magnetic powder was cooled to room temperature while passing the hydrogen gas. Then, the hydrogen gas was switched to a nitrogen-oxygen mixture gas, and the magnetic powder was again heated to 60° C. and stabilized in the nitrogen-oxygen mixture gas for 8 hours. Thereafter, the magnetic powder was recovered in the air.

According to an X-ray fluorescent analysis, the obtained neodymium-iron-boron magnetic powder contained 2.4 atomic % of neodymium and 9.1 atomic % of boron, based on iron.

The obtained neodymium-iron-boron magnetic powder was observed with a transmission electron microscope (magnification: 100,000 times). As shown in FIG. 1, the powder consisted of substantially spherical or ellipsoidal particles, and had an average particle size of 25 nm.

The magnetic powder had a saturation magnetization of 16.6 $\mu$Wb/g and a coercive force of 191.8 kA/m when measured with applying a magnetic field of 1,273.3 kA/m.

Example 2

Preparation of neodymium-iron-boron magnetic powder II

A neodymium-iron-boron magnetic powder was produced in the same manner as in Example 1 except that the amount of neodymium nitrate added was changed from 0.002 mole to 0.008 mole.

According to the X-ray fluorescent analysis, the obtained neodymium-iron-boron magnetic powder contained 8.2 atomic % of neodymium and 8.3 atomic % of boron, based on iron.

The obtained neodymium-iron-boron magnetic powder was observed with a transmission electron microscope. The powder consisted of substantially spherical or ellipsoidal particles like the magnetic powder of Example 1, and had an average particle size of 30 nm.

The magnetic powder had a saturation magnetization of 15.0 $\mu$Wb/g and a coercive force of 219.6 kA/m when measured with applying a magnetic field of 1,273.3 kA/m.

Example 3

Preparation of neodymium-iron-boron magnetic powder III

Iron (III) nitrate (0.140 mole) and neodymium nitrate (0.002 mole) were dissolved in water (200 cc). Separately, sodium hydroxide (0.42 mole) was dissolved in water (200 cc). The latter solution of sodium hydroxide was added to the former solution of the nitrates and stirred for 5 minutes to obtain the hydroxides of iron and neodymium. The hydroxides were washed with water and filtrated to recover the hydroxides.

Then, water (150 cc) and boric acid (0.1 mole) were added to the wet hydroxides to redisperse the hydroxides of iron and neodymium in the aqueous solution of boric acid. The dispersion was heated at 90° C. for 2 hours, washed with water to remove excessive boric acid, and dried at 60° C. for 4 hours to obtain the hydroxides of iron and neodymium containing boric acid.

The hydroxides of iron and neodymium containing boric acid were heated and dehydrated in the air at 300° C. for 2 hours, and then reduced in the hydrogen stream at 450° C. for 4 hours to obtain a neodymium-iron-boron magnetic powder. The magnetic powder was cooled to room temperature while passing the hydrogen gas. Then, the hydrogen gas was switched to a nitrogen-oxygen mixture gas, and the magnetic powder was again heated to 60° C. and stabilized in the nitrogen-oxygen mixture gas for 8 hours. Thereafter, the magnetic powder was recovered in the air.

According to an X-ray fluorescent analysis, the obtained neodymium-iron-boron magnetic powder contained 1.3 atomic % of neodymium and 5.1 atomic % of boron, based on iron.

The obtained neodymium-iron-boron magnetic powder was observed with a transmission electron microscope (magnification: 100,000 times). The powder consisted of substantially spherical or ellipsoidal particles like the magnetic powder of Example 1, and had an average particle size of 15 nm.

The magnetic powder had a saturation magnetization of 16.1 $\mu$Wb/g and a coercive force of 162.3 kA/m when measured with applying a magnetic field of 1,273.3 kA/m.

Example 4

Preparation of neodymium-iron-boron magnetic powder IV

A neodymium-iron-boron magnetic powder was produced in the same manner as in Example 3 except that the amount of neodymium nitrate added was changed from 0.002 mole to 0.001 mole.

According to the X-ray fluorescent analysis, the obtained neodymium-iron-boron magnetic powder contained 0.7 atomic % of neodymium and 6.3 atomic % of boron, based on iron.

The obtained neodymium-iron-boron magnetic powder was observed with a transmission electron microscope. The powder consisted of substantially spherical or ellipsoidal particles like the magnetic powder of Example 1, and had an average particle size of 15 nm.

The magnetic powder had a saturation magnetization of 16.8 µWb/g and a coercive force of 173.5 kA/m when measured with applying a magnetic field of 1,273.3 kA/m.

Example 5

Preparation of neodymium-iron-boron magnetic powder V

Iron (III) nitrate (0.140 mole) was dissolved in water (200 cc). Separately, sodium hydroxide (0.42 mole) was dissolved in water (200 cc). The latter solution of sodium hydroxide was added to the former solution of iron nitrate and stirred for 5 minutes to obtain iron hydroxide. The hydroxide was washed with water and filtrated to recover the hydroxide.

Then, water (150 cc), neodymium nitrate (0.002 mole) and boric acid (0.2 mole) were added to the wet hydroxide to redisperse the hydroxides of iron and neodymium in the aqueous solution of boric acid and the neodymium ion. The dispersion was spread in a vat and dried at 60° C. for 4 hours to remove water. Thus, the homogeneous mixture of the hydroxides of iron and neodymium and boric acid was obtained.

The mixture was then comminuted and charged in an aluminum crucible and heated in the air at 200° C. for 4 hours to obtain neodymium-iron oxide to which boron was bonded. The heated material was washed with water to remove excessive boron to obtain the neodymium-iron oxide particles to which boron was bonded. The oxide particles were reduced in the hydrogen stream at 450° C. for 4 hours to obtain a neodymium-iron-boron magnetic powder.

The magnetic powder was cooled to room temperature while passing the hydrogen gas. Then, the hydrogen gas was switched to a nitrogen-oxygen mixture gas, and the magnetic powder was again heated to 60° C. and stabilized in the nitrogen-oxygen mixture gas for 8 hours. Thereafter, the magnetic powder was recovered in the air.

According to an X-ray fluorescent analysis, the obtained neodymium-iron-boron magnetic powder contained 0.9 atomic % of neodymium and 7.9 atomic % of boron, based on iron.

The obtained neodymium-iron-boron magnetic powder was observed with a transmission electron microscope. The powder consisted of substantially spherical or ellipsoidal particles like the magnetic powder of Example 1, and had an average particle size of 30 nm.

The magnetic powder had a saturation magnetization of 17.7 µWb/g and a coercive force of 146.4 kA/m when measured with applying a magnetic field of 1,273.3 kA/m.

Example 6

Preparation of neodymium-iron-boron magnetic powder VI

A neodymium-iron-boron magnetic powder was produced in the same manner as in Example 5 except that the amount of neodymium nitrate, which was added together with boric acid, was changed from 0.002 mole to 0.005 mole.

According to the X-ray fluorescent analysis, the obtained neodymium-iron-boron magnetic powder contained 1.6 atomic % of neodymium and 5.6 atomic % of boron, based on iron.

The obtained neodymium-iron-boron magnetic powder was observed with a transmission electron microscope. The powder consisted of substantially spherical or ellipsoidal particles like the magnetic powder of Example 1, and had an average particle size of 25 nm.

The magnetic powder had a saturation magnetization of 16.7 µWb/g and a coercive force of 157.6 kA/m when measured with applying a magnetic field of 1,273.3 kA/m.

Example 7

Preparation of samarium-iron-boron magnetic powder I

A magnetic powder was produced using samarium in place of neodymium.

Iron (III) nitrate (0.140 mole) and samarium nitrate (0.002 mole) were dissolved in water (200 cc). Separately, sodium hydroxide (0.42 mole) was dissolved in water (200 cc). The latter solution of sodium hydroxide was added to the former solution of the nitrates of iron and samarium and stirred for 5 minutes to obtain the hydroxides of iron and samarium. The hydroxides were washed with water and filtrated to recover the hydroxides. Then, water (150 cc) and boric acid (0.1 mole) were added to the wet hydroxides to redisperse the hydroxides of iron and samarium in the aqueous solution of boric acid. The dispersion was heated 90° C. for 2 hours, and then washed with water to remove excessive boric acid. The washed hydroixdes were dried at 60° C. for 4 hours to obtain the hydroxides of iron and samarium containing boric acid.

The hydroxides of iron and samarium containing boric acid were heated and dehydrated in the air at 300° C. for 2 hours, and then reduced in the hydrogen stream at 450° C. for 4 hours to obtain a samarium-iron-boron magnetic powder. The magnetic powder was cooled to room temperature while passing the hydrogen gas. Then, the hydrogen gas was switched to a nitrogen-oxygen mixture gas, and the magnetic powder was again heated to 60° C. and stabilized in the nitrogen-oxygen mixture gas for 8 hours. Thereafter, the magnetic powder was recovered in the air.

According to an X-ray fluorescent analysis, the obtained samarium-iron-boron magnetic powder contained 1.2 atomic % of samarium and 5.6 atomic % of boron, based on iron.

The obtained neodymium-iron-boron magnetic powder was observed with a transmission electron microscope (magnification: 100,000 times). The powder consisted of substantially spherical or ellipsoidal particles like the magnetic powder of Example 1, and had an average particle size of 15 nm.

The magnetic powder had a saturation magnetization of 16.5 µWb/g and a coercive force of 156.0 kA/m when measured with applying a magnetic field of 1,273.3 kA/m.

Example 8

Preparation of samarium-iron-boron magnetic powder II

A samarium-iron-boron magnetic powder was produced in the same manner as in Example 7 except that the amount of samarium nitrate added was changed from 0.002 mole to 0.001 mole.

According to the X-ray fluorescent analysis, the obtained samarium-iron-boron magnetic powder contained 0.7 atomic % of samarium and 7.1 atomic % of boron, based on iron.

The obtained samarium-iron-boron magnetic powder was observed with a transmission electron microscope. The powder consisted of substantially spherical or ellipsoidal particles like the magnetic powder of Example 1, and had an average particle size of 20 nm.

The magnetic powder had a saturation magnetization of 17.7 µWb/g and a coercive force of 164.7 kA/m when measured with applying a magnetic field of 1,273.3 kA/m.

Example 9

Preparation of samarium-iron-boron magnetic powder III

A magnetic powder was produced using samarium in place of neodymium.

Iron (III) nitrate (0.140 mole) and samarium nitrate (0.002 mole) were dissolved in water (200 cc). Separately, sodium hydroxide (0.42 mole) was dissolved in water (200 cc). The latter solution of sodium hydroxide was added to the former solution of the nitrates of iron and samarium and stirred for 5 minutes to obtain the hydroxides of iron and samarium. The hydroxides were washed with water and filtrated to recover the hydroxides. Then, water (50 cc) and boric acid (0.5 mole) were added to the wet hydroxides to redisperse the hydroxides of iron and samarium in the aqueous solution of boric acid. The dispersion was spread in the vat and dried at 60° C. for 4 hours remove water. Thus, the homogeneous mixture of the hydroxides of iron and samarium and boric acid was obtained.

The mixture was then comminuted and charged in an aluminum crucible and heated in an air at 200° C. for 4 hours to obtain neodymium-iron oxide to which boron was bonded. The hydroxides of iron and samarium containing boric acid were heated and dehydrated in the air at 300° C. for 2 hours, and then reduced in the hydrogen stream at 450° C. for 4 hours to obtain a samarium-iron-boron magnetic powder. The magnetic powder was cooled to room temperature while passing the hydrogen gas. Then, the hydrogen gas was switched to a nitrogen-oxygen mixture gas, and the magnetic powder was again heated to 60° C. and stabilized in the nitrogen-oxygen mixture gas for 8 hours. Thereafter, the magnetic powder was recovered in the air.

According to an X-ray fluorescent analysis, the obtained samarium-iron-boron magnetic powder contained 1.4 atomic % of samarium and 9.5 atomic % of boron, based on iron.

The obtained neodymium-iron-boron magnetic powder was observed with a transmission electron microscope (magnification: 100,000 times). The powder consisted of substantially spherical or ellipsoidal particles like the magnetic powder of Example 1, and had an average particle size of 25 nm.

The magnetic powder had a saturation magnetization of 16.7 $\mu$Wb/g and a coercive force of 183.0 kA/m when measured with applying a magnetic field of 1,273.3 kA/m.

Example 10

Preparation of neodymium-iron-cobalt-boron magnetic powder I

Iron (III) nitrate (0.098 mole), cobalt(II) nitrate (0.042 mole) and neodymium nitrate (0.002 mole) were dissolved in water (200 cc). Separately, sodium hydroxide (0.42 mole) was dissolved in water (200 cc). The latter solution of sodium hydroxide was added to the former solution of the nitrates and stirred for 5 minutes to obtain the hydroxides of iron, cobalt and neodymium. The hydroxides were washed with water and filtrated to recover the hydroxides.

Then, water (150 cc) and boric acid (0.1 mole) were added to the wet hydroxides to redisperse the hydroxides of iron, cobalt and neodymium in the aqueous solution of boric acid. The dispersion was heated at 90° C. for 2 hours, washed with water to remove excessive boric acid, and then dried at 60° C. for 4 hours to obtain the hydroxides of iron, cobalt and neodymium containing boric acid.

The hydroxides of iron, cobalt and neodymium containing boric acid were heated and dehydrated in the air at 300° C. for 2 hours, and then reduced in the hydrogen stream at 450° C. for 4 hours to obtain a neodymium-iron-cobalt-boron magnetic powder. The magnetic powder was cooled to room temperature while passing the hydrogen gas. Then, the hydrogen gas was switched to a nitrogen-oxygen mixture gas, and the magnetic powder was again heated to 60° C. and stabilized in the nitrogen-oxygen mixture gas for 8 hours. Thereafter, the magnetic powder was recovered in the air.

According to an X-ray fluorescent analysis, the obtained neodymium-iron-cobalt-boron magnetic powder contained 1.9 atomic % of neodymium, 40.1 atomic % of cobalt and 7.5 atomic % of boron, based on iron.

The obtained neodymium-iron-cobalt-boron magnetic powder was observed with a transmission electron microscope (magnification: 100,000 times). The powder consisted of substantially spherical or ellipsoidal particles like the magnetic powder of Example 1, and had an average particle size of 20 nm.

The magnetic powder had a saturation magnetization of 19.7 $\mu$Wb/g and a coercive force of 174.3 kA/m when measured with applying a magnetic field of 1,273.3 kA/m.

Example 11

Preparation of neodymium-iron-cobalt-boron magnetic powder II

A neodymium-iron-cobalt-boron magnetic powder was produced in the same manner as in Example 10 except that the amount of iron nitrate was changed from 0.098 mole to 0.126 mole and the amount of cobalt nitrate added was changed from 0.042 mole to 0.014 mole.

According to the X-ray fluorescent analysis, the obtained neodymium-iron-cobalt-boron magnetic powder contained 1.5 atomic % of neodymium, 10.8 atomic % of cobalt and 6.1 atomic % of boron, based on iron.

The obtained neodymium-iron-cobalt-boron magnetic powder was observed with a transmission electron microscope. The powder consisted of substantially spherical or ellipsoidal particles like the magnetic powder of Example 1, and had an average particle size of 25 nm.

The magnetic powder had a saturation magnetization of 19.3 $\mu$Wb/g and a coercive force of 183.0 kA/m when measured with applying a magnetic field of 1,273.3 kA/m.

Example 12

Preparation of samarium-iron-cobalt-boron magnetic powder I

A samarium-iron-cobalt-boron magnetic powder was produced in the same manner as in Example 10 except that samarium nitrate was used in place of neodymium nitrate.

According to the X-ray fluorescent analysis, the obtained samarium-iron-cobalt-boron magnetic powder contained 1.8 atomic % of samarium, 41.6 atomic % of cobalt and 8.0 atomic % of boron, based on iron.

The obtained neodymium-iron-cobalt-boron magnetic powder was observed with a transmission electron microscope. The powder consisted of substantially spherical or ellipsoidal particles like the magnetic powder of Example 1, and had an average particle size of 20 nm.

The magnetic powder had a saturation magnetization of 19.3 $\mu$Wb/g and a coercive force of 183.0 kA/m when measured with applying a magnetic field of 1,273.3 kA/m.

Example 13

Preparation of samarium-iron-cobalt-boron magnetic powder II

A samarium-iron-cobalt-boron magnetic powder was produced in the same manner as in Example 10 except that samarium nitrate was used in place of neodymium nitrate, and the amounts of iron nitrate and cobalt nitrate were changed from 0.098 mole and 0.042 to 0.112 mole and 0.028 mole, respectively.

According to the X-ray fluorescent analysis, the obtained samarium-iron-cobalt-boron magnetic powder contained 1.6 atomic % of samarium, 26.0 atomic % of cobalt and 7.1 atomic % of boron, based on iron.

The obtained neodymium-iron-cobalt-boron magnetic powder was observed with a transmission electron microscope. The powder consisted of substantially spherical or ellipsoidal particles like the magnetic powder of Example 1, and had an average particle size of 20 nm.

The magnetic powder had a saturation magnetization of 18.6 $\mu$Wb/g and a coercive force of 169.5 kA/m when measured with applying a magnetic field of 1,273.3 kA/m.

Example 14

Preparation of neodymium-iron-cobalt-nickel-boron magnetic powder I

A neodymium-iron-cobalt-nickel-boron magnetic powder was produced in the same manner as in Example 10 except that 0.035 mole of cobalt nitrate and 0.007 mole of nickel nitrate were used in place of 0.042 mole of cobalt nitrate.

According to the X-ray fluorescent analysis, the obtained samarium-iron-cobalt-boron magnetic powder contained 1.8 atomic % of neodymium, 33.9 atomic % of cobalt, 6.8 atomic % of nickel and 7.7 atomic % of boron, based on iron.

The obtained neodymium-iron-cobalt-nickel-boron magnetic powder was observed with a transmission electron microscope. The powder consisted of substantially spherical or ellipsoidal particles like the magnetic powder of Example 1, and had an average particle size of 20 nm.

The magnetic powder had a saturation magnetization of 17.5 $\mu$Wb/g and a coercive force of 160.8 kA/m when measured with applying a magnetic field of 1,273.3 kA/m.

Comparative Example 1

Preparation of neodymium-iron magnetic powder I

Iron (III) nitrate (0.140 mole) and neodymium nitrate (0.002 mole) were dissolved in water (200 cc). Separately, sodium hydroxide (0.42 mole) was dissolved in water (200 cc). The latter solution of sodium hydroxide was added to the former solution of the nitrates and stirred for 5 minutes to obtain the hydroxides of iron and neodymium. The hydroxides were washed with water and filtrated to recover the hydroxides.

After drying at 60° C. for 4 hours, the hydroxides of iron and neodymium were heated and dehydrated in the air at 300° C. for 2 hours, and then reduced in the hydrogen stream at 450° C. for 4 hours to obtain a neodymium-iron magnetic powder. The magnetic powder was cooled to room temperature while passing the hydrogen gas. Then, the hydrogen gas was switched to a nitrogen-oxygen mixture gas, and the magnetic powder was again heated to 60° C. and stabilized in the nitrogen-oxygen mixture gas for 8 hours. Thereafter, the magnetic powder was recovered in the air.

This preparation process differs from those of the Examples in that no treatment with boron was carried out. Thus, no boron was contained in the intermediate product or the final product of the magnetic powder.

According to an X-ray fluorescent analysis, the obtained neodymium-iron magnetic powder contained 1.4 atomic % of neodymium based on iron.

The obtained neodymium-iron magnetic powder was observed with a transmission electron microscope (magnification: 100,000 times). The powder consisted of particles having irregular shapes and a wide particle size distribution ranging from about 50 nm to several hundred nanometers, and contained particles having a particle size of 200 nm or more. Such large particles maybe formed by partial sintering of the particles.

The magnetic powder had a saturation magnetization of 16.2 $\mu$Wb/g and a coercive force of 78.0 kA/m when measured with applying a magnetic field of 1,273.3 kA/m.

Comparative Example 2

Preparation of neodymium-iron magnetic powder II

A neodymium-iron magnetic powder was prepared in the same manner as in Comparative Example 1 except that the amount of neodymium nitrate was changed from 0.002 to 0.005.

According to an X-ray fluorescent analysis, the obtained neodymium-iron magnetic powder contained 3.3 atomic % of neodymium based on iron.

The obtained neodymium-iron magnetic powder was observed with a transmission electron microscope (magnification: 100,000 times). The powder consisted of particles having irregular shapes and a wide particle size distribution and contained particles having a particle size of 200 nm or more, like the magnetic powder of Comparative Example 1.

The magnetic powder had a saturation magnetization of 13.8 $\mu$Wb/g and a coercive force of 83.6 kA/m when measured with applying a magnetic field of 1,273.3 kA/m.

Comparative Example 3

Preparation of samarium-iron magnetic powder

A samarium-iron magnetic powder was prepared in the same manner as in Comparative Example 1 except that samarium nitrate was used in place of neodymium nitrate.

According to an X-ray fluorescent analysis, the obtained samarium-iron magnetic powder contained 3.0 atomic % of samarium based on iron.

The obtained samarium-iron magnetic powder was observed with a transmission electron microscope (magnification: 100,000 times). The powder consisted of particles having irregular shapes and a wide particle size distribution and contained particles having a particle size of 200 nm or more, like the magnetic powder of Comparative Example 1.

The magnetic powder had a saturation magnetization of 15.3 $\mu$Wb/g and a coercive force of 85.9 kA/m when measured with applying a magnetic field of 1,273.3 kA/m.

Comparative Example 4

Preparation of iron magnetic powder

An iron magnetic powder was prepared in the same manner as in Comparative Example 1 except that no neodymium nitrate was used.

The obtained iron magnetic powder was observed with a transmission electron microscope (magnification: 100,000 times). Apparently, the particles were sintered and had irregular shapes with a particle size of sub-micron.

The magnetic powder had a saturation magnetization of 24.6 µWb/g and a coercive force of 2.4 kA/m when measured with applying a magnetic field of 1,273.3 kA/m.

Comparative Example 5

Preparation of iron-cobalt magnetic powder

An iron-cobalt magnetic powder was prepared in the same manner as in Comparative Example 1 except that 0.098 mole of iron nitrate and 0.042 mole of cobalt nitrate were used in place of 0.140 mole of iron nitrate, and no neodymium nitrate was used.

The obtained iron-cobalt magnetic powder contained 41.4 atomic % of cobalt based on iron.

The obtained iron-cobalt magnetic powder was observed with a transmission electronmicroscope (magnification: 100,000 times). Apparently, the particles were sintered and had irregular shapes with a particle size of sub-micron like the magnetic powder of Comparative Example 4.

The magnetic powder had a saturation magnetization of 28.6 µWb/g and a coercive force of 4.0 kA/m when measured with applying a magnetic field of 1,273.3 kA/m.

Comparative Example 6

Preparation of iron-boron magnetic powder

An iron-boron magnetic powder was prepared in the same manner as in Example 3 except that no neodymium nitrate was used.

Comparative Example 7

Preparation of iron-cobalt-boron magnetic powder

An iron-cobalt-boron magnetic powder was prepared in the same manner as in Example 10 except that no neodymium nitrate was used.

The obtained iron-cobalt-boron magnetic powder contained 42.0 atomic % of cobalt and 6.1 atomic % of boron, based on iron.

The obtained iron-boron magnetic powder was observed with a transmission electronmicroscope (magnification: 100,000 times). The magnetic powder consisted of substantially spherical or ellipsoidal particles, and had an average particle size of 30 nm.

The magnetic powder had a saturation magnetization of 19.9 µWb/g and a coercive force of 70.0 kA/m when measured with applying a magnetic field of 1,273.3 kA/m.

Table 1 summarizes the contents of rare earth metal elements, transition metals and boron based on iron, the shapes and sizes of the particles and the magnetic characteristics of the magnetic powders prepared in Examples and Comparative Examples.

TABLE 1

| Ex. No. | Magnetic Powder | Content (atom. %) base on iron | | | | | Particle shape | Particle size (nm) | Coercive force (kA/m) | Saturation magnetization (µWb/g) |
| --- | --- | --- | --- | --- | --- | --- | --- | --- | --- | --- |
| | | Nd | Sm | Co | Ni | B | | | | |
| Ex. 1 | Nd—Fe—B | 2.4 | — | — | — | 9.1 | Sphere to Ellipsoid | 25 | 191.8 | 16.6 |
| Ex. 2 | Nd—Fe—B | 8.2 | — | — | — | 8.3 | Sphere to Ellipsoid | 30 | 219.6 | 15.0 |
| Ex. 3 | Nd—Fe—B | 1.3 | — | — | — | 5.1 | Sphere to Ellipsoid | 15 | 162.3 | 16.1 |
| Ex. 4 | Nd—Fe—B | 0.7 | — | — | — | 6.3 | Sphere to Ellipsoid | 15 | 173.5 | 16.8 |
| Ex. 5 | Nd—Fe—B | 0.9 | — | — | — | 7.9 | Sphere to Ellipsoid | 30 | 146.4 | 17.7 |
| Ex. 6 | Nd—Fe—B | 1.6 | — | — | — | 5.6 | Sphere to Ellipsoid | 25 | 157.6 | 16.7 |
| Ex. 7 | Sm—Fe—B | — | 1.2 | — | — | 5.6 | Sphere to Ellipsoid | 15 | 156.0 | 16.5 |
| Ex. 8 | Sm—Fe—B | — | 0.7 | — | — | 7.1 | Sphere to Ellipsoid | 20 | 164.7 | 17.7 |
| Ex. 9 | Sm—Fe—B | — | 1.4 | — | — | 9.5 | Sphere to Ellipsoid | 25 | 183.0 | 16.7 |
| Ex. 10 | Nd—Fe—Co—B | 1.9 | — | 40.1 | — | 7.5 | Sphere to Ellipsoid | 20 | 174.3 | 19.7 |
| Ex. 11 | Nd—Fe—Co—B | 1.5 | — | 10.8 | — | 6.1 | Sphere to Ellipsoid | 15 | 173.5 | 18.0 |
| Ex. 12 | Sm—Fe—Co—B | — | 1.8 | 41.6 | — | 8.0 | Sphere to Ellipsoid | 20 | 183.0 | 19.3 |
| Ex. 13 | Sm—Fe—Co—B | — | 1.6 | 26.0 | — | 7.1 | Sphere to Ellipsoid | 20 | 169.5 | 18.6 |
| Ex. 14 | Nd—Fe—Co—Ni—B | 1.8 | — | 33.9 | 6.8 | 7.7 | Sphere to Ellipsoid | 20 | 160.8 | 17.5 |
| C. Ex. 1 | Nd—Fe | 1.4 | — | — | — | — | Irregular | >50 | 78.0 | 16.2 |
| C. Ex. 2 | Nd—Fe | 3.3 | — | — | — | — | Irregular | >50 | 83.6 | 13.8 |
| C. Ex. 3 | Sm—Fe | — | 3.0 | — | — | — | Irregular | >50 | 85.9 | 15.3 |
| C. Ex. 4 | Fe | — | — | — | — | — | Sintered | Submicron | 2.4 | 24.6 |
| C. Ex. 5 | Fe—Co | — | — | 41.4 | — | — | Sintered | Submicron | 4.0 | 28.6 |
| C. Ex. 6 | Fe—B | — | — | — | — | 5.6 | Sphere to Ellipsoid | 40 | 42.9 | 18.2 |
| C. Ex. 7 | Fe—Co—B | — | — | 42.0 | — | 6.1 | Sphere to Ellipsoid | 30 | 70.0 | 19.9 |

The obtained iron-boron magnetic powder contained 5.6 atomic % of boron based on iron.

The obtained iron-boron magnetic powder was observed with a transmission electronmicroscope (magnification: 100,000 times). The magnetic powder consisted of substantially spherical or ellipsoidal particles, and had an average particle size of 40 nm.

The magnetic powder had a saturation magnetization of 18.2 µWb/g and a coercive force of 42.9 kA/m when measured with applying a magnetic field of 1,273.3 kA/m.

<Production of magnetic tape>

Examples 15–25 and Comparative Examples 8–13

Example 15

The following components for an undercoat layer were kneaded with a kneader and dispersed with a sand mill in a residence time of 60 minutes. To the mixture, a polyisocyanate (6 parts) was added, stirred and then filtrated to obtain an undercoat paint.

Separately, the following components (1) for a magnetic paint were kneaded with a kneader and dispersed with a same mill in a residence time of 45 minutes. To this mixture, the components (2) for the magnetic paint were added, stirred and filtrated to obtain a magnetic paint.

| <Components of undercoat paint> | parts |
|---|---|
| Titanium oxide powder (av. particle size: 0.035 μm) | 70 |
| Titanium oxide powder (av. particle size: 0.1 μm) | 10 |
| Carbon black (av. particle size: 0.075 μm) | 20 |
| Vinyl chloride copolymer (SO$_3$Na groups: 0.7 × 10$^{-4}$ eq./g) | 10 |
| Polyester polyurethane resin (SO$_3$Na groups: 1.0 × 10$^{-4}$ eq./g) | 5 |
| Methyl ethyl ketone | 130 |
| Toluene | 80 |
| Myristic acid | 1 |
| Butyl stearate | 1.5 |
| Cyclohexanone | 65 |

| <Magnetic paint components (1)> | parts |
|---|---|
| Neodymium-iron-boron magnetic powder of Example 1 (Nd: 2.4 atomic %, B: 9.1 atomic %, based on iron; Coercive force: 191.8 kA/m; Saturation magnetization: 16.6 μWb/g; Av. particle size: 25 nm; Sphere to ellipsoid) | 100 |
| Vinyl chloride-hydroxypropyl acrylate copolymer (SO$_3$Na groups: 0.7 × 10$^{-4}$ eq./g) | 8 |
| Polyester polyurethane resin (SO$_3$Na groups: 1.0 × 10$^{-4}$ eq./g) | 4 |
| α-Alumina (av. particle size: 0.4 μm) | 10 |
| Carbon black (av. particle size: 100 nm) | 1.5 |
| Myristic acid | 1.5 |
| Methyl ethyl ketone | 133 |
| Toluene | 100 |

| <Magnetic paint components (2)> | parts |
|---|---|
| Stearic acid | 1.5 |
| Polyisocyanate | 4 |
| Cyclohexanone | 133 |
| Toluene | 33 |

The undercoat paint was applied on a polyethylene terephthalate film (Degrees of thermal shrinkage of 0.8% and 0.6% in the machine and transverse directions, respectively after heating at 105° C. for 30 minutes) as a non-magnetic support to form an undercoat layer having a thickness of 2 μm after drying and calendering. On the undercoat layer, the magnetic paint was applied while applying a magnetic field of 0.3 T along the machine direction so that the magnetic layer had a thickness of 0.12 μm after drying and calendering, and then dried.

Next, on the surface of the non-magnetic support opposite to the surface on which the undercoat layer and the magnetic layer were formed, a back coat paint was applied so that the back coat layer had a thickness of 0.7 μm after drying and calendering, and dried. The back coat paint was prepared by dispersing the following components with a sand mill in a residence time of 45 minutes, adding a polyisocyanate (8.5 parts) to the mixture and then stirring and filtrating the mixture.

| <Components of back coat paint> | parts |
|---|---|
| Carbon black (av. particle size: 25 nm) | 40.5 |
| Carbon black (av. particle size: 370 nm) | 0.5 |
| Barium sulfate | 4.05 |
| Nitrocellulose | 28 |
| Polyurethane resin (containing SO$_3$Na groups) | 20 |
| Cyclohexanone | 100 |
| Toluene | 100 |
| Methyl ethyl ketone | 100 |

The produced magnetic sheet was planish finished with five-stage calendering (at 70° C. under a linear pressure of 147 kN/m) and aged at 60° C., 40%RH for 48 hours with winding the sheet around a sheet core. Then, the sheet was slit at a width of 3.8 mm, and the surface of the magnetic layer of the obtained tape was abraded with a ceramic wheel (a rotation speed of +150% and a winding angle of 30 degrees) while traveling the tape at a rate of 100 m/min. Thus, a magnetic tape having a length of 125 m was obtained. The magnetic tape was installed in a cartridge and used as a tape for a computer.

Example 16

A magnetic tape was produced in the same manner as in Example 15 except that the thickness of the magnetic layer after drying and calendering was changed to 0.28 μm.

Example 17

A magnetic tape was produced in the same manner as in Example 15 except that the thickness of the magnetic layer after drying and calendering was changed to 0.09 μm.

Example 18

A magnetic tape was produced in the same manner as in Example 15 except that the neodymium-iron-boron magnetic powder of Example 3 (coercive force: 162.3 kA/m, saturation magnetization: 16.1 μWb/g, average particle size: 15 nm, particle shape: sphere to ellipsoid) was used as a magnetic powder, and the thickness of the magnetic layer after drying and calendering was changed to 0.18 μm.

Example 19

A magnetic tape was produced in the same manner as in Example 18 except that the thickness of the magnetic layer after drying and calendering was changed to 0.11 μm.

Example 20

A magnetic tape was produced in the same manner as in Example 18 except that the thickness of the magnetic layer after drying and calendering was changed to 0.07 μm Example 21

A magnetic tape was produced in the same manner as in Example 15 except that the samarium-iron-boron magnetic powder of Example 7 (coercive force: 156.0 kA/m, saturation magnetization: 16.5 μWb/g, average particle size: 15 nm, particle shape: sphere to ellipsoid) was used as a magnetic powder, the thickness of the magnetic layer after drying and calendering was changed to 0.12 μm.

Example 22

A magnetic tape was produced in the same manner as in Example 15 except that the neodymium-iron-cobalt-boron magnetic powder of Example 10 (coercive force: 174.3 kA/m, saturation magnetization: 19.7 µWb/g, average particle size: 20 nm, particle shape: sphere to ellipsoid) was used as a magnetic powder, the thickness of the magnetic layer after drying and calendering was changed to 0.11 µm.

Example 23

A magnetic tape was produced in the same manner as in Example 15 except that the same undercoat as that of Example 15 was formed, and then the magnetic paint of Example 18 (magnetic powder: neodymium-iron-boron type, coercive force: 162.3 kA/m, saturation magnetization: 16.1 µWb/g, average particle size: 15 nm, particle shape: sphere to ellipsoid) was applied on the undercoat layer without the orientation with the magnetic field so that the thickness of the magnetic layer after drying and calendering was 0.12 µm.

In Examples 15 and 18, the coated magnetic paint was subjected to the orientation treatment in the machine direction with the magnetic field to achieve the high squareness in the machine direction, while in Example 23, no orientation treatment with the magnetic field was carried out so that the same level of squareness could be attained in any directions including the machine and perpendicular directions.

In general, since the conventional magnetic powder particles have an acicular shape, they are oriented in the machine direction to some extent in the absence of the orientation treatment with the magnetic field. However, since the magnetic powder particles of the present invention have a spherical or ellipsoidal shape, they are less influenced by the mechanical orientation and thus the same level of squareness can be easily attained in any directions.

Example 24

A magnetic tape was produced in the same manner as in Example 15 except that the same undercoat as that of Example 15 was formed, and then the magnetic paint of Example 18 (magnetic powder: neodymium-iron-boron type, coercive force: 162.3 kA/m, saturation magnetization: 16.1 µWb/g, average particle size: 15 nm, particle shape: sphere to ellipsoid) was applied on the undercoat layer while applying a magnetic field of 0.3 T in the direction perpendicular to the coated magnetic paint layer so that the thickness of the magnetic layer after drying and calendering was 0.15 µm.

In Examples 15 and 18, the coated magnetic paint was subjected to the orientation treatment in the machine direction with the magnetic field to achieve the high squareness in the machine direction, while in Example 24, the magnetic field was applied in the direction perpendicular to the magnetic layer so that the high squareness could be attained in the direction perpendicular to the magnetic layer.

In general, since the conventional magnetic powder particles have an acicular shape, they are aligned on the surface of the undercoat layer in the direction perpendicular to the undercoat layer when the magnetic filed is applied in the direction perpendicular to the layer. As a result, the surface of the magnetic layer is severely deteriorated. However, since the magnetic powder particles of the present invention have a spherical or ellipsoidal shape, they have substantially no shape anisotropy and thus the produced recording media have the surface properties comparable with the magnetic media which are oriented in the machine direction even when the magnetic powder particles are oriented in the direction perpendicular to the undercoat layer.

Example 25

A magnetic tape was produced in the same manner as in Example 15 except that no undercoat layer was formed, the magnetic paint of Example 18 (magnetic powder: neodymium-iron-boron type, coercive force: 162.3 kA/m, saturation magnetization: 16.1 µWb/g, average particle size: 15 nm, particle shape: sphere to ellipsoid) was applied directly on the support film while applying a magnetic field of 0.3 T in the machine direction so that the thickness of the magnetic layer after drying and calendering was 0.51 µm.

Comparative Example 8

A magnetic tape was produced in the same manner as in Example 15 except that an acicular iron-cobalt alloy magnetic powder (Co: 24.6 atomic % based on iron; coercive force: 189.4 kA/m, saturation magnetization: 18.3 µWb/g, average major axis length: 150 nm, acicular ratio: 5) was used as a magnetic powder in the magnetic paint and the thickness of the magnetic layer after drying-and calendering was changed to 0.50 µm.

Comparative Example 9

A magnetic tape was produced in the same manner as in Comparative Example 8 except that the thickness of the magnetic layer after drying and calendering was changed to 0.35 µm.

Comparative Example 10

A magnetic tape was produced in the same manner as in Comparative Example 8 except that the thickness of the magnetic layer after drying and calendering was changed to 0.20 µm Comparative Example 11

A magnetic tape was produced in the same manner as in Example 15 except that the neodymium-iron magnetic powder of Comparative Example 1 (coercive force: 78.0 kA/m, saturation magnetization: 16.2 µWb/g, average particle size: >50 nm) was used as a magnetic powder in the magnetic paint and the thickness of the magnetic layer after drying and calendering was changed to 0.28 µm.

Comparative Example 12

A magnetic tape was produced in the same manner as in Example 15 except that the iron-cobalt-boron magnetic powder of Comparative Example 7 (coercive force: 70.0 kA/m, saturation magnetization: 19.9 µWb/g, average particle size: 30 nm) was used as a magnetic powder in the magnetic paint and the thickness of the magnetic layer after drying and calendering was changed to 0.16 µm.

Comparative Example 13

A magnetic tape was produced in the same manner as in Example 15 except that an acicular iron-cobalt alloy magnetic powder (Co: 24.6 atomic % based on iron; coercive force: 189.4 kA/m, saturation magnetization: 18.3 µWb/g, average major axis length: 150 nm, acicular ratio: 5) was used as a magnetic powder in the magnetic paint, no undercoat layer was provided, and the magnetic paint was applied directly on the support film while applying a magnetic field of 0.3 T in the direction perpendicular to the coated magnetic paint layer so that the thickness of the magnetic layer was 0.58 µm after drying and calendering, and then dried.

With the magnetic tapes produced in Examples 15–25 and Comparative Examples 8–13, a coercive force (Hc), a saturated magnetic flux density (Bm), a squareness (Br/Bm) and an anisotropic magnetic field distribution (Ha) were measured as the magnetic properties.

The anisotropic magnetic field distribution was expressed by a value obtained by dividing a magnetic field corresponding to a half-width value of a differential curve in the second quadrant of the hysteresis curve (demagnetization curve) of the tape by the coercive force of the tape. That is, as the coercive force distribution of the magnetic powder is narrower or the dispersion and orientation of the magnetic powder in the tape is better, Ha is smaller. When the coercive force is the same, the smaller Ha leads to the better recording characteristics in particular in the short wavelength range.

As one of the electromagnetic conversion characteristics, a block error rate (BER) was measured by recording random data signals of a shortest recording wavelength of 0.33 μm with a DDS drive (C1554A manufactured by Hewlett-Packard) and measuring a block error rate with a block error measuring apparatus.

The results are summarized in Table 2 together with the thickness of the magnetic layer of each magnetic tape.

thickness of the magnetic layer is decreased to 0.3 μm or less. In particular, when the thickness of the magnetic layer is made very thin, for example, 0.09 μm (Example 17) or 0.07 μm (Example 20), the characteristics hardly deteriorate, and the low block error rate is maintained. Accordingly, it is understood that the magnetic recording media comprising the rare earth element-iron-boron magnetic powder according to the present invention can exhibit their properties particularly when the thickness of the magnetic layer is 0.3 μm or less. Such an effect may be based on the specific particle shape and size of the magnetic powder of the present invention.

The magnetic tape which was produced using the magnetic powder of the present invention without the orientation in the magnetic field (Example 23) and one which was produced using the magnetic powder of the present invention with the orientation in the perpendicular direction (Example 24) have the lower block error rate than the magnetic tapes in which the magnetic powder particles were oriented in the machine direction. Such a result depends on the recording density to be measured, the forms of the media, etc. For example, the magnetic tapes of Examples 23 and 24 will exhibit excellent properties in the high recording density range, or in the form of a disc. At all events, it is

TABLE 2

| Ex. No | Magnetic powder | Thickness of magnetic layer (μm) | Coercive force (kA/m) (machine direction) | Residual magnetic flux Bm (T) | Squreness (Br/Bm) (machine direction) | Squreness (Br/Bm) (perpendicular direction) | Anisotropic magnetic field distribution (Ha) | BER |
|---|---|---|---|---|---|---|---|---|
| Ex. 15 | NdFeB | 0.12 | 203.7 | 0.382 | 0.86 | — | 0.51 | 0.8xE-03 |
| Ex. 16 | NdFeB | 0.28 | 199.7 | 0.390 | 0.87 | — | 0.52 | 4.2xE-03 |
| Ex. 17 | NdFeB | 0.09 | 204.5 | 0.366 | 0.85 | — | 0.50 | 1.0xE-03 |
| Ex. 18 | NdFeB | 0.18 | 174.3 | 0.373 | 0.82 | — | 0.49 | 0.8xE-03 |
| Ex. 19 | NdFeB | 0.11 | 178.3 | 0.370 | 0.83 | — | 0.46 | 0.6xE-03 |
| Ex. 20 | NdFeB | 0.07 | 181.4 | 0.361 | 0.81 | — | 0.47 | 0.7xE-03 |
| Ex. 21 | SmFeB | 0.12 | 165.5 | 0.375 | 0.83 | — | 0.48 | 0.8xE-03 |
| Ex. 22 | NdFeCoB | 0.11 | 183.8 | 0.402 | 0.82 | — | 0.45 | 0.6xE-03 |
| Ex. 23 | NdFeB | 0.12 | 164.7 | 0.379 | 0.66 | 0.61 | 0.61 | 8.6xE-03 |
| Ex. 24 | NdFeB | 0.15 | 136.1 | 0.362 | 0.40 | 0.75 | 0.53 | 0.8xE-02 |
| Ex. 25 | NdFeB | 0.51 | 172.7 | 0.388 | 0.82 | — | 0.54 | 9.5xE-03 |
| C. Ex. 8 | FeCo | 0.50 | 183.8 | 0.395 | 0.83 | — | 0.61 | 1.6xE-01 |
| C. Ex. 9 | FeCo | 0.35 | 183.0 | 0.373 | 0.82 | — | 0.61 | 3.8xE-02 |
| C. Ex. 10 | FeCo | 0.20 | 179.9 | 0.352 | 0.80 | — | 0.65 | 7.0xE-02 |
| C. Ex. 11 | NdFe | 0.28 | 83.6 | 0.289 | 0.72 | — | 0.72 | >1xE-01 |
| C. Ex. 12 | FeCoB | 0.16 | 74.8 | 0.399 | 0.84 | — | 0.60 | >1xE-01 |
| C. Ex. 13 | FeCo | 0.58 | 186.2 | 0.390 | 0.85 | — | 0.63 | 7.2xE-01 |

From the results in Table 2, it can be seen that the magnetic tapes of Examples have the smaller anisotropic magnetic field distribution than those of Comparative Examples and that, as a result, the block error rate, which is one of the electromagnetic conversion characteristics, is small and thus the reliability of the magnetic tapes are good. These results may be due the fact that the rare earth element-iron-boron magnetic powders used in the Examples have a high coercive force based on the uniaxial crystalline magnetic anisotropy although their particle shape is sphere to ellipsoid, the magnetic powders have high saturation magnetization although their particles are very fine, and furthermore they have a high filling rate.

According to the above results, it can be seen that the magnetic recording media comprising the rare earth element-iron-boron magnetic powder according to the present invention have apparently better recording properties than those comprising the conventional acicular magnetic powder when they have the same thickness of the magnetic layers, and that such an effect is enhanced as the apparent that the magnetic powder of the present invention exhibits the better properties than the conventional acicular magnetic powder irrespective of the presence or absence of the orientation or the direction of the magnetic field orientation.

Among the magnetic tapes of Comparative Examples 8–10 comprising the acicular magnetic powder, the magnetic tape having the thickness of the magnetic layer of smaller than 0.3 μm (Comparative Example 10) had the inferior block error rate to one having the thickness of the magnetic layer exceeding 0.3 μm (Comparative Example 9). This is because the acicular magnetic powder has the distribution when it is dispersed in the magnetic layer and some magnetic powder particles may protrude from the surface of the magnetic layer, and thus the surface smoothness of the magnetic layer is disturbed. Such a problem is fatal to the acicular magnetic powder. On the other hand, the magnetic tape comprising the acicular magnetic powder and having a thickness of the magnetic layer of about 0.3 μm (Comparative Example 9) had the rather good block error rate, but had inferior properties to the magnetic tapes of Examples having a thickness of the magnetic layer of 0.3 μm or less. Such a result is peculiar to the longitudinal recording media, since the various types of demagnetization occur as the thickness of the magnetic layer increases. Furthermore, the magnetic tape comprising the acicular magnetic powder and having a large thickness of the magnetic layer of 0.5 μm (Comparative Example 8) and the magnetic tape comprising no undercoat layer and having the large thickness of the magnetic layer (Comparative Example 13) had the much lower properties than the magnetic tape having a thickness of the magnetic layer of 0.35 μm (Comparative Example 9).

The magnetic tape comprising the non-acicular neodymium-iron magnetic powder (Comparative Example 11) had not only a low coercive force but also low frequency characteristics and the high block error rate, since the magnetic powder had the wide particle size distribution.

The magnetic tape comprising the iron-cobalt-boron magnetic powder having the same particle shape as that of the magnetic powder of the present invention (Comparative Example 12) had the good block error rate at the low recording density, but the worse block error rate than the magnetic tapes of Examples at the high recording density.

Examples 26–30 and Comparative Example 14

Example 26

The following components for an undercoat layer were kneaded with a kneader and dispersed with a sand mill in a residence time of 50 minutes. To the mixture, a polyisocyanate (6 parts) was added, stirred and then filtrated to obtain an undercoat paint.

Separately, the following components for a magnetic paint were kneaded with a kneader and dispersed with a sand mill in a residence time of 45 minutes to obtain a magnetic paint.

| <Components of undercoat paint> | parts |
|---|---|
| α-Iron oxide (av. major axis length: 0.14 μm; av. acicular ratio: 7) | 65 |
| α-Alumina particles (av. particle size: 0.4 μm) | 10 |
| Carbon black (av. particle size: 0.024 μm) | 18 |
| Carbon black (av. particle size: 0.075 μm) | 7 |
| Vinyl chloride-vinyl acetate-vinyl alcohol copolymer ($SO_3Na$ groups: $0.7 \times 10^{-4}$ eq./g) | 16 |
| Polyurethane resin ($SO_3Na$ groups: $1 \times 10^{-4}$ eq./g) | 7 |
| Oleyl oleate | 6 |
| n-Butyl stearate | 2 |
| Cyclohexanone | 200 |
| Methyl ethyl ketone | 200 |

<Magnetic paint components>

A magnetic paint was prepared in the same manner as in Example 15 except that the neodymium-iron-boron magnetic powder produced in Example 4 (Nd: 0.7 atomic %, B: 6.3 atomic %, based on iron; Coercive force: 173.5 kA/m; Saturation magnetization: 16.8 μWb/g; Av. particle size: 15 nm; Particle shape: sphere to ellipsoid) was used in place of the neodymium-iron-boron magnetic powder used in Example 5.

The undercoat paint was applied on a polyamide film having a thickness of 4 μm as a non-magnetic support to form an undercoat layer having a thickness of 2 μm after drying, and calendering. On the undercoat layer which was still wet, the magnetic paint was applied while applying a magnetic field of 0.3 T along the machine direction so that the magnetic layer had a thickness of 0.20 μm after drying and calendering, and then dried.

Next, on the surface of the non-magnetic support opposite to the surface on which the undercoat layer and the magnetic layer were formed, a back coat paint was applied in the same manner as in Example 15 so that the back coat layer had a thickness of 0.7 μm after drying and calendering, and dried.

The produced magnetic sheet was planish finished with five-stage calendering (at 70° C. under a linear pressure of 147 kN/m) and aged at 60° C., 40%RH for 48 hours with winding the sheet around a sheet core. Then, the sheet was slit at a width of 3.8 mm, and the surface of the magnetic layer of the obtained tape was abraded with a ceramic wheel (a rotation speed of +120% and a winding angle of 30 degrees) while traveling the tape at a rate of 100 m/min. Thus, a magnetic tape having a length of 125 m was obtained. The magnetic tape was installed in a cartridge and used as a tape for a computer.

Example 27

A magnetic tape for a computer was produced in the same manner as in Example 26 except that a magnetic sheet was produced using the neodymium-iron-boron magnetic powder produced in Example5 (Nd: 0.9 atomic %, B: 7.9 atomic %, based on iron; Coercive force: 146.4 kA/m; Saturation magnetization: 17.7 μWb/g; Av. particle size: 30 nm; Particle shape: sphere to ellipsoid) was used as a magnetic powder, and the residence time was changed to 30 minutes, and the produced magnetic sheet was, planish polished by the five-stage calendering (at 80° C. under a linear pressure of 118 kN/m).

Example 28

A magnetic tape for a computer was produced in the same manner as in Example 26 except that 65 parts of a titanium oxide powder (Average particle size: 0.08 μm) was used as an inorganic powder in the uncercoat paint in place of 65 parts of α-iron oxide (Average major axis length: 0.14 μm, average acicular ratio: 7), and the residence time in the preparation of the undercoat paint was changed to 60 minutes, and the produced magnetic sheet was planish polished by the five-stage calendering (at 80° C. under a linear pressure of 245 kN/m).

Example 29

A magnetic tape for a computer was produced in the same manner as in Example 26 except that the samarium-iron-cobalt-boron magnetic powder produced in Example 12 (Sm: 1.8 atomic %, Co: 41.6 atomic %, B: 8.0 atomic %, based on iron; Coercive force: 198.9 kA/m; Saturation magnetization: 19.4 μWb/g; Av. particle size: 20 nm; Particle shape: sphere to ellipsoid) was used as a magnetic powder.

Comparative Example 14

A magnetic tape for a computer was produced in the same manner as in Example 26 except that a neodymium-iron-boron acicular magnetic powder (Nd: 5.2 atomic %, B: 20.0 atomic %, based on iron; Coercive force: 163.1 kA/m; Saturation magnetization: 16.3 μWb/g; Av. particle size: 100 nm; Particle shape: acicular, aspect ratio: 5) was used as a magnetic powder, and the residence time was changed to 30 minutes.

The above neodymium-iron-boron acicular magnetic powder was produced by dispersing acicular goethite ($\alpha$-FeOOH) particles in the aqueous solution of a neodymium salt, depositing neodymium hydroxide on the surfaces of the goethite particles in the solution of an alkali, treating the goethite particles carrying neodymium hydroxide with boron, and reducing the intermediate product in the hydrogen gas atmosphere, according to the method for the production of the magnetic powder of the present invention explained in the Examples.

Neodymium-iron-boron acicular magnetic powders used in the following Comparative Examples were produced in the same method as above except that the amounts of the acicular goethite as the starting material, the rare earth element and boron were changed.

The P-V values on the magnetic layer surfaces of the magnetic tapes for the computer produced in Examples 26–29 and Comparative Example 14 were measured using the optical interference type three-dimensional surface roughness meter (TOPO-3D).

As the short wavelength output of the magnetic tapes, a peak-to-peak value of the output from a playback amplifier at the shortest recording wavelength of 0.49 $\mu$m was measured with an oscilloscope using the same drive as used in Example 15. The measured values are expressed as relative values to that of the magnetic tape of Example 14 (100%).

The results are shown in Table 3 together with the properties of the magnetic tapes.

TABLE 3

| Ex. No | Magnetic Powder | Shape of magnetic power particles | particle size (nm) | Thickness of magnetic layer ($\mu$m) | P-V (nm) | Output (%) |
|---|---|---|---|---|---|---|
| Ex. 26 | Nd—Fe—B | Sphere to ellipsoid | 15 | 0.2 | 33 | 117 |
| Ex. 27 | Nd—Fe—B | Sphere to ellipsoid | 30 | 0.2 | 48 | 110 |
| Ex. 28 | Nd—Fe—B | Sphere to ellipsoid | 15 | 0.2 | 28 | 128 |
| Ex. 29 | Sm—Fe—Co—B | Sphere to ellipsoid | 20 | 0.2 | 35 | 125 |
| C. Ex. 14 | Nd—Fe—B | Acicular (aspect ratio: 5) | 100 | 0.2 | 75 | 100 |

As can be seen from the results of Examples 26 to 29, the good output is attained even in the case of the short wavelength recording, when the magnetic powders of the present invention are used, and the P-V values, which are measured with the optical interference type three-dimensional surface roughness meter, are 50 nm or less. In contrast, in the case of the magnetic tape produced in Comparative Example 14 which had the same thickness of the magnetic layer and used the neodymium-iron-boron magnetic powder having the same coercive force as those in Examples, the magnetic powder particles are easily agglomerated in the dispersing process, and the magnetic powder particles penetrate into the undercoat layer in the orientation step so that the surface of the magnetic layer is roughened. Thus, the surface smoothness deteriorates and the output decreases.

According to the present invention, when the thin magnetic layer having a thickness of 0.3 $\mu$m or less is formed, the deterioration of the surface smoothness of the magnetic layer, which is the problem of the conventional acicular magnetic powder, can be suppressed and the high output characteristics can be attained with the recording system using the shortest recording wavelength of 1.0 $\mu$m or less.

Examples 30–32 and Comparative Example 15

Example 30

The following components for an undercoat layer were kneaded with a kneader and dispersed with a sand mill in a residence time of 60 minutes. To the mixture, a polyisocyanate (6 parts) was added, stirred and then filtrated to obtain an undercoat paint.

Separately, the following components for a magnetic paint were kneaded with a kneader and dispersed with a sand mill in a residence time of 50 minutes to obtain a magnetic paint.

| <Components of undercoat paint> | parts |
|---|---|
| $\gamma$-Iron oxide (av. major axis length: 0.12 $\mu$m; aspect ratio: 8; Hc: 23.9 kA/m; $\sigma_s$: 9.4 $\mu$Wb/g, BET specific surface area: 25 m$^2$/g) | 65 |
| $\alpha$-Alumina particles (av. particle size: 0.4 $\mu$m) | 10 |
| Carbon black (av. particle size: 0.024 $\mu$m) | 25 |
| Vinyl chloride-vinyl acetate-vinyl alcohol copolymer (SO$_3$Na groups: 0.7 × 10$^{-4}$ eq./g) | 16 |
| Polyurethane resin (SO$_3$Na groups: 1 × 10$^{-4}$ eq./g) | 7 |
| Oleyl oleate | 6 |
| n-Butyl stearate | 2 |
| Cyclohexanone | 200 |
| Methyl ethyl ketone | 200 |

| <Magnetic paint components (3)> | parts |
|---|---|
| Neodymium-iron-boron magnetic powder of Example 2 (Nd: 8.2 atomic %, B: 8.3 atomic %, based on iron; Coercive force: 219.6 kA/m; Saturation magnetization: 15.0 $\mu$Wb/g; Av. particle size: 30 nm; Particle shape: sphere to ellipsoid) | 100 |
| Vinyl chloride-hydroxypropyl acrylate copolymer (SO$_3$Na groups: 0.7 × 10$^{-4}$ eq./g) | 8 |
| Polyester polyurethane resin (SO$_3$Na groups: 1.0 × 10$^{-4}$ eq./g) | 7 |
| $\alpha$-Alumina (av. particle size: 0.4 $\mu$m) | 8 |
| Carbon black (av. particle size: 100 nm) | 1.5 |
| Myristic acid | 1.5 |
| Methyl ethyl ketone | 133 |
| Toluene | 100 |

| <Magnetic paint component (4)> | Parts |
|---|---|
| Stearic acid | 1.5 |
| Polyisocyanate | 4 |
| Cyclohexanone | 133 |
| Toluene | 33 |

The undercoat paint was applied on a polyamide film (Young's modulus in the transverse direction (0.3% elongation): 15.7×10$^9$ N/m$^2$) as a non-magnetic support to form an undercoat layer having a thickness of 2 $\mu$m after drying and calendering. On the undercoat layer, the magnetic paint was applied while applying a magnetic field of 0.3 T along the machine direction so that the magnetic layer had a thickness of 0.15 $\mu$m after drying and calendering, and then dried.

Next, on the surface of the non-magnetic, support opposite to the surface on which the undercoat layer and the magnetic layer were formed, a back coat paint was applied in the same manner as in Example 15 so that the back coat layer had a thickness of 0.7 µm after drying and calendering, and dried.

The produced magnetic sheet was planish finished with five-stage calendering (at 80° C. under a linear pressure of 147 kN/m) and aged at 60° C., 40%RH for 48 hours with winding the sheet around a sheet core. Then, the sheet was slit at a width of 3.8 mm, and the surface of the magnetic layer of the obtained tape was abraded with a ceramic wheel (a rotation speed of +150% and a winding angle of 30 degrees) while traveling the tape at a rate of 100 m/min. Thus, a magnetic tape having a length of 125 m was obtained. The magnetic tape was installed in a cartridge and used as a tape for a computer.

Example 31

A magnetic tape for a computer was produced in the same manner as in Example 30 except that the neodymium-iron-cobalt-boron magnetic powder produced in Example 11 (Nd: 1.5 atomic %, Co: 10.8 atomic %, B: 6.1 atomic %, based on iron; Coercive force: 173.5 kA/m; Saturation magnetization: 18.0 µWb/g; Av. article size: 15 nm; Particle shape: sphere to ellipsoid) was used as a magnetic powder, and the amounts of the vinyl chloride-hydroxypropyl acrylate copolymer and the polyester polyurethane resin were changed to 10 parts and 4 parts, respectively.

Example 32

A magnetic tape for a computer was produced in the same manner as in Example 30 except that the samarium-iron-cobalt-boron magnetic powder produced in Example 13 (Sm: 1.6 atomic %, Co: 26.0 atomic %, B: 7.1 atomic %, based on iron; Coercive force: 169.5 kA/m; Saturation magnetization: 18.6 µWb/g; Av. particle size: 20 nm; Particle shape: sphere to ellipsoid) was used as a magnetic powder, the amounts of the vinyl chloride-hydroxypropyl acrylate copolymer and the polyester polyurethane resin were changed to 5 parts and 10 parts, respectively, and a polyamide film (Young's modulus in the transverse direction (0.3% elongation): $13.7 \times 10^9$ N/m$^2$) was used as a non-magnetic support.

Comparative Example 15

A magnetic tape for a computer was produced in the same manner as in Example 30 except that a neodymium-iron-boron acicular magnetic powder (Nd: 10.5 atomic %, B: 25.0 atomic %, based on iron; Coercive force: 155.2 kA/m; Saturation magnetization: 16.3 µWb/g; Av. particle size: 250 nm; Particle shape: acicular; Aspect ratio: 8) was used as a magnetic powder, the amounts of the vinyl chloride-hydroxypropyl acrylate copolymer and the polyester polyurethane resin were changed to 15 parts and 2 parts, respectively, and a polyester film (Young's modulus in the transverse direction (0.3% elongation): $4.4 \times 10^9$ N/m$^2$) was used as a non-magnetic support.

The Young's moduli at 0.3% elongation in the machine direction ($Y_{MD}$) and the transverse direction ($Y_{TD}$) of the magnetic tapes for the computer produced in Examples 30–32 and Comparative Example 15 were measured using a tensile tester at 250° C., 60%RH at a stretching rate of 10%/min., and the ratio of $Y_{TD}$ to $Y_{MD}$ was calculated.

The bad head contact of the magnetic tape against the magnetic head leads to the low envelope because of the bias contact, so that the fluctuation of the output increases. Thus, the head contact was evaluated by measuring the maximum output (A) and the minimum output (B) in one track using the same drive as used in Example 15, and calculating the output ratio: (A−B)/[(A+B)/2].

The result are shown in Table 4 together with the properties of the magnetic tapes.

TABLE 4

| Ex. No. | Magnetic powder | Shape of magnetic powder particles | Average particle size (nm) | $Y_{TD}/Y_{MD}$ | Envelope (%) |
|---|---|---|---|---|---|
| Ex. 30 | Nd—Fe—B | Sphere to Ellipsoid | 30 | 1.42 | 8 |
| Ex. 31 | Nd—Fe—Co—B | Sphere to Ellipsoid | 15 | 1.45 | 5 |
| Ex. 32 | Sm—Fe—Co—B | Sphere to Ellipsoid | 20 | 1.26 | 12 |
| C. Ex. 15 | Nd—Fe—B | Acicular (aspect ratio: 8) | 250 | 0.87 | 23 |

From the results of Examples 30–32, it can be seen that the magnetic tapes of the present invention have better head contact than the magnetic tape comprising the conventional magnetic powder, when the former magnetic tapes comprise the magnetic powder of the present invention, and the ratio of the Young's modulus in the transverse direction to that in the machine direction ($Y_{TD}/Y_{MD}$) is in the range between 1.0 and 1., that is, the Young's modulus in the transverse direction is increased. In contrast, since the magnetic tape of Comparative Example 15 comprises the magnetic powder having the acicular shape and the large particle size, the magnetic powder particles are easily aligned in the machine direction so that the strength in the transverse direction is weaker than that in the machine direction, and thus the sliding contact against the magnetic head is localized. Accordingly, the head contact is remarkably deteriorated. According to the present invention, the strength in the transverse direction can be increased in relation to the machine direction in comparison with the conventional acicular magnetic powder, and thus the good head contact can be achieved.

Effects of the Invention

As described above, the present invention realizes the breakthrough of the coating type magnetic recording media by firstly making it possible to practically use the very thin magnetic layer of 0.3 µm or less, which cannot be used in the case of the coating type magnetic recording media using the conventional acicular magnetic powder. Thus, the practical value of the recording characteristics achieved by the present invention is very high.

What is claimed is:

1. A magnetic recording medium comprising a non-magnetic support and a magnetic layer formed thereon which contains a magnetic powder and a binder, wherein said magnetic powder is a rare earth element-iron-boron magnetic powder having an average particle size of 5 to 200 nm and possesses (i) a substantially spherical particulate shape or (ii) a substantially ellipsodial particle shape having a ratio of a major axis to a minor axis of 2 or less.

2. The magnetic recording medium according to claim 1, wherein the contents of said rare earth element and boron are from 0.2 to 20 atomic % and from 0.5 to 30 atomic %, based on iron, respectively.

3. The magnetic recording medium according to claim 1, wherein said magnetic powder further comprises a transition metal other than iron.

4. The magnetic recording medium according to claim 1, wherein the particles of said magnetic powder comprise a core part of metal iron or an iron alloy and a shell part of a rare earth element-iron-boron material.

5. The magnetic recording medium according to claim 1, which further comprises at least one undercoat layer which comprises an inorganic powder and a binder between said non-magnetic support and said. magnetic layer, and said magnetic layer has an average thickness of 0.3 μm or less.

6. The magnetic recording medium according to claim 1, wherein a magnetization-easy-axis is present in the machine direction of said magnetic layer, a coercive force in the machine direction is from 80 to 400 kA/m, a squareness is from 0.6 to 0.9, and a saturated magnetic flux density is from 0.1 to 0.5 T.

7. The magnetic recording medium according to claim 1, wherein a magnetization-easy-axis is present in a direction perpendicular to the plane of said magnetic layer, a coercive force in said perpendicular direction is from 60 to 320 kA/m, a squareness is from 0.5 to 0.8, and a saturated magnetic flux density is from 0.1 to 0.5 T.

8. The magnetic recording medium according to claim 1, wherein magnetization-easy-axes are randomly distributed in the plane of said magnetic layer, a coercive force in any directions in the plane of said magnetic layer and a direction perpendicular to the plane of said magnetic layer is from 60 to 380 kA/m, a squareness is from 0.4 to 0.7, and a saturated magnetic flux density is from 0.1 to 0.5 T.

9. A rare earth-iron-boron magnetic powder comprising a rare earth element, iron and boron, which has a coercive force of 80 to 400 kA/m, a saturdation magnetization of 10 to 25 μWb/g, an average particle size of 5 to 200 nm, and possessing (i) a substantially spherical particulate shape or (ii) a substantially ellipsoidal particle shape having a ratio of a major axis to a minor axis of 2 or less.

10. The magnetic powder according to claim 9, wherein the contents of the rare earth element and boron are from 0.2 to 20 atomic % and from 0.5 to 30 atomic %, based on iron, respectively.

11. The magnetic powder according to claim 9, wherein the particles of said magnetic powder comprise a core part of metal iron or an iron alloy and a shell part of a rare earth element-iron-boron material.

12. The magnetic powder according to claim 9, which further comprises a transition metal other than iron.

13. The magnetic powder according to claim 12, wherein said transition metal other than iron is cobalt or a mixture of cobalt and nickel.

14. A method for producing a rare earth element-iron-boron magnetic powder comprising the steps of:

mixing an aqueous solution containing at least rare earth element ion and iron ion and an aqueous solution of an alkali to form a coprecipitate of the rare earth element and iron, adding a boron compound to said coprecipitate, heating the mixture to form the oxides of the rare earth element and iron containing boron, heating and reducing said oxides to obtain substantially spherical or substantially ellipsoidal magnetic particles having an average particle size of 5 to 200 nm, a coercive force of 80 to 400 kA/m and a saturation magnetization of 10 to 25 μWb/g, and wherein the substantially ellipsoidal magnetic particles possess a ratio of a major axis to a minor axis of 2 or less.

15. A method for producing a rare earth element-iron-boron magnetic powder comprising the steps of:

mixing an aqueous solution containing at least iron ion and an aqueous solution of an alkali to form a hydroxide of iron, adding a rare earth element and a boron compound to said hydroxide of iron, heating the mixture to form the oxides of the rare earth element and iron containing boron, heating and reducing said oxide to obtain substantially spherical or substantially ellipsoidal magnetic particles having an average particle size of 5 to 200 nm, a coercive force of 80 to 400 kA/m and a saturation magnetization of 10 to 25 μWb/g, and wherein the substantially ellipsoidal magnetic particles possess a ratio of a major axis to a minor axis of 2 or less.

* * * * *